(12) United States Patent
Barnes et al.

(10) Patent No.: US 8,459,877 B2
(45) Date of Patent: Jun. 11, 2013

(54) OPTICAL FIBER HANDLER FOR A FIBER OPTIC CONNECTION TERMINATION SYSTEM

(75) Inventors: Brandon A. Barnes, Ft. Worth, TX (US); Kevin C. Beach, Haltom City, TX (US); Ashley W. Jones, Denton, TX (US); Greg J. Scherer, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 236 days.

(21) Appl. No.: 13/006,906

(22) Filed: Jan. 14, 2011

(65) Prior Publication Data

US 2011/0176774 A1 Jul. 21, 2011

Related U.S. Application Data

(60) Provisional application No. 61/295,467, filed on Jan. 15, 2010.

(51) Int. Cl.
*G02B 6/36* (2006.01)
*G02B 6/38* (2006.01)

(52) U.S. Cl.
USPC .............. 385/56; 385/76; 385/134; 385/135; 385/136; 385/96; 385/97; 385/137

(58) Field of Classification Search
USPC .................. 385/134, 135, 136, 137, 147, 96, 385/97, 98, 99, 128, 53, 56, 76
See application file for complete search history.

(56) References Cited

U.S. PATENT DOCUMENTS

| | | | |
|---|---|---|---|
| 5,337,633 A | 8/1994 | Carpenter et al. | 81/9.51 |
| 5,351,333 A * | 9/1994 | Chambers | 385/134 |
| 5,367,594 A | 11/1994 | Essert et al. | 385/70 |
| 6,078,719 A | 6/2000 | Wiegand et al. | 385/137 |
| 6,079,297 A | 6/2000 | Chandler et al. | 81/9.51 |
| 6,754,960 B1 | 6/2004 | Shiraishi et al. | 30/90.6 |
| 6,915,060 B2 * | 7/2005 | Schlueter et al. | 385/137 |
| 7,011,454 B2 | 3/2006 | Caveney et al. | 385/87 |
| 7,116,882 B2 * | 10/2006 | Watte et al. | 385/134 |

(Continued)

FOREIGN PATENT DOCUMENTS

| EP | 1249724 A1 | 10/2002 |
| JP | 2005-208487 | 8/2005 |

(Continued)

OTHER PUBLICATIONS

Patent Cooperation Treaty, International Preliminary Report on Patentability, Jul. 17, 2012, 5 pages.

*Primary Examiner* — Brian Healy
(74) *Attorney, Agent, or Firm* — Michael E. Carroll, Jr.

(57) ABSTRACT

An optical fiber handler for optical connector termination systems and other devices are disclosed herein. The optical fiber handler attaches to the optical fiber or cable and cooperates with other components for preparing the optical fiber and/or making the optical connection, thereby providing a simple, reliable, and easy termination for the optical fiber. For instance, the handler may cooperate with one or more of the following a strip tool, strip/clean tool, cleave tool for preparing the end of the optical fiber(s), and/or a mechanical splice connector for making the optical connection. Additionally, after the optical fiber handler is attached to the mechanical splice connector it may be easily removed by the craft if necessary to reposition and reterminated the mechanical splice.

25 Claims, 21 Drawing Sheets

U.S. PATENT DOCUMENTS

| | | | |
|---|---|---|---|
| 7,178,990 B2 | 2/2007 | Caveney et al. | 385/87 |
| 7,241,056 B1 | 7/2007 | Kuffel et al. | 385/60 |
| 7,280,733 B2 | 10/2007 | Larson et al. | 385/139 |
| 7,347,627 B2 | 3/2008 | Saito et al. | 385/60 |
| 7,369,738 B2 | 5/2008 | Larson et al. | 385/134 |
| 7,398,599 B2 | 7/2008 | Shiraishi et al. | 30/90.1 |
| 7,452,138 B2 | 11/2008 | Saito et al. | 385/86 |
| 7,556,438 B2 | 7/2009 | Oike et al. | 385/78 |
| 7,568,845 B2 | 8/2009 | Caveney et al. | 385/87 |
| 7,628,549 B2 | 12/2009 | Takahashi et al. | 385/98 |
| 7,637,673 B2 | 12/2009 | Oike et al. | 385/98 |
| 7,654,748 B2 | 2/2010 | Kuffel et al. | 385/60 |
| 7,722,262 B2 | 5/2010 | Caveney et al. | 385/78 |
| 7,806,600 B2 | 10/2010 | Marrs et al. | 385/81 |
| 2002/0131753 A1* | 9/2002 | Flower et al. | 385/137 |
| 2003/0091317 A1* | 5/2003 | Schlueter et al. | 385/137 |
| 2005/0058422 A1* | 3/2005 | Doss et al. | 385/137 |
| 2008/0107381 A1 | 5/2008 | Nishioka et al. | 385/60 |
| 2008/0247710 A1 | 10/2008 | Oike et al. | 385/78 |
| 2008/0304795 A1 | 12/2008 | Oike et al. | 385/81 |
| 2009/0031864 A1 | 2/2009 | Fritsche | 81/9.51 |
| 2009/0148109 A1 | 6/2009 | Takahashi et al. | 385/98 |
| 2009/0238523 A1* | 9/2009 | Honma et al. | 385/96 |
| 2010/0129034 A1 | 5/2010 | Kuffel et al. | 385/81 |
| 2010/0220962 A1 | 9/2010 | Caveney et al. | 385/78 |
| 2011/0176774 A1* | 7/2011 | Barnes et al. | 385/56 |

FOREIGN PATENT DOCUMENTS

| | | |
|---|---|---|
| JP | 2005-265973 | 9/2005 |
| JP | 2005-265974 | 9/2005 |
| JP | 2005-265975 | 9/2005 |
| JP | 2005-283954 | 10/2005 |
| JP | 2007-065248 | 3/2007 |
| JP | 2007-240943 | 9/2007 |
| JP | 2008-089703 | 4/2008 |
| WO | WO2009/051918 A1 | 4/2009 |
| WO | WO2010/120570 A2 | 10/2010 |

* cited by examiner

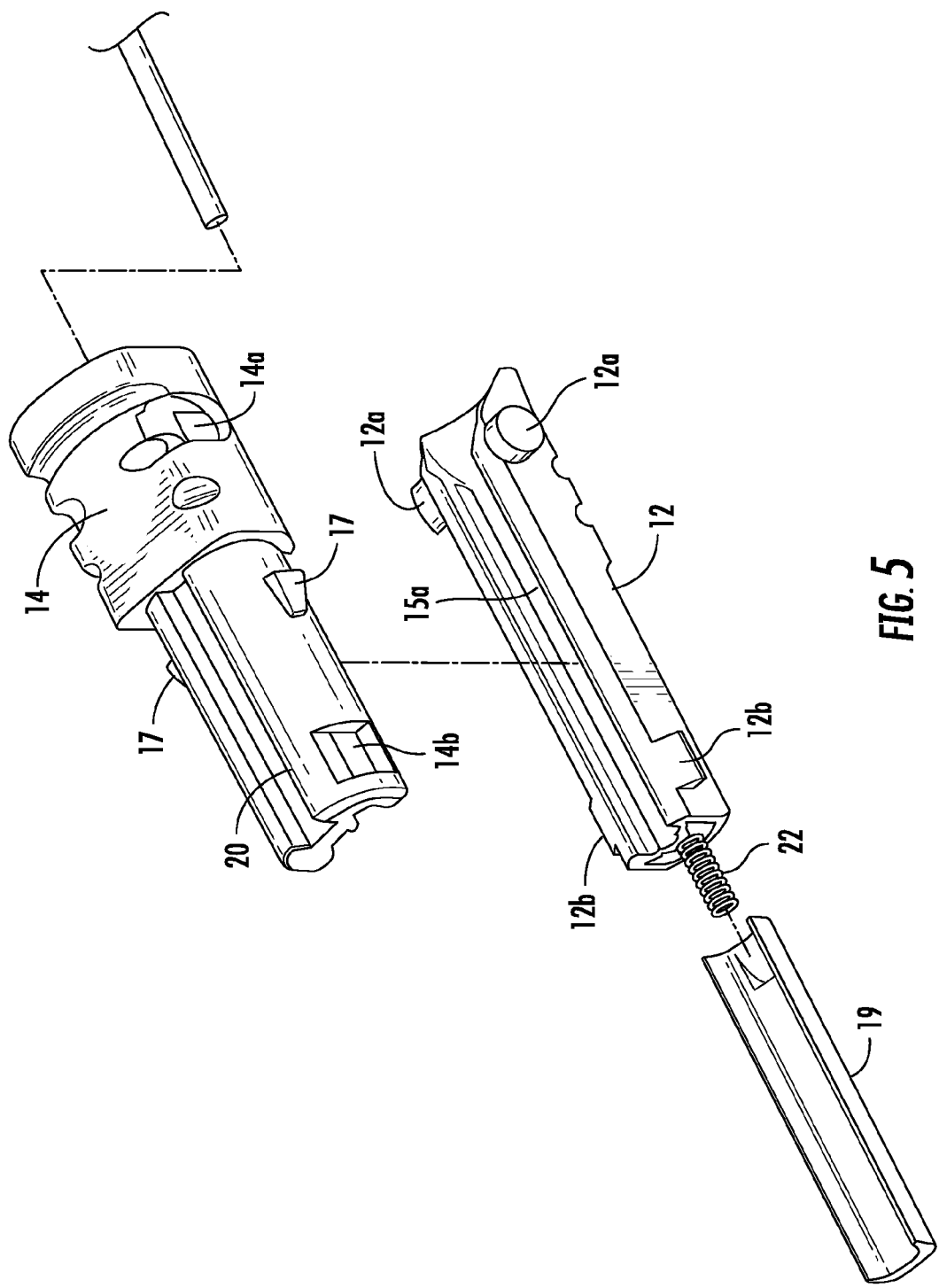

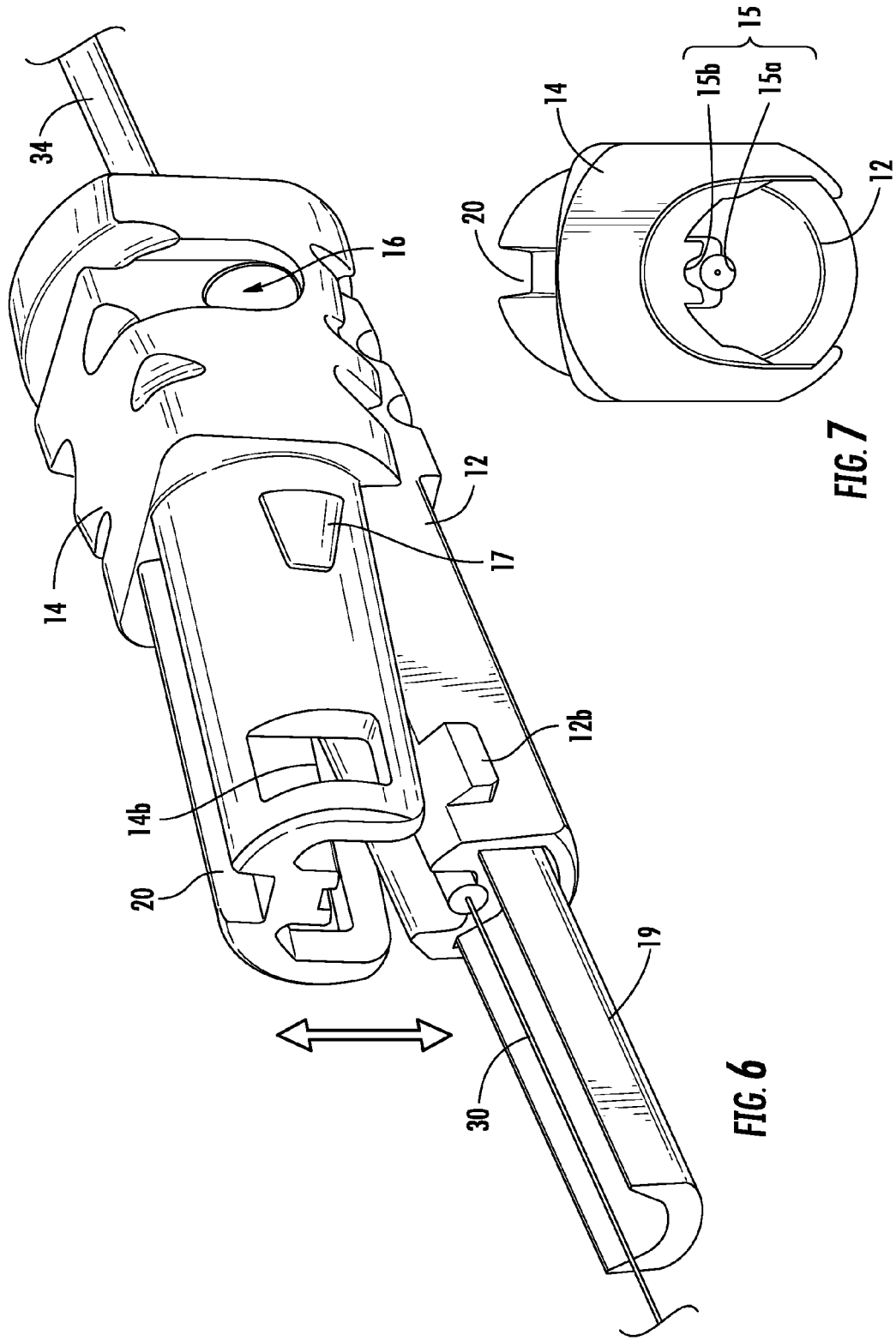

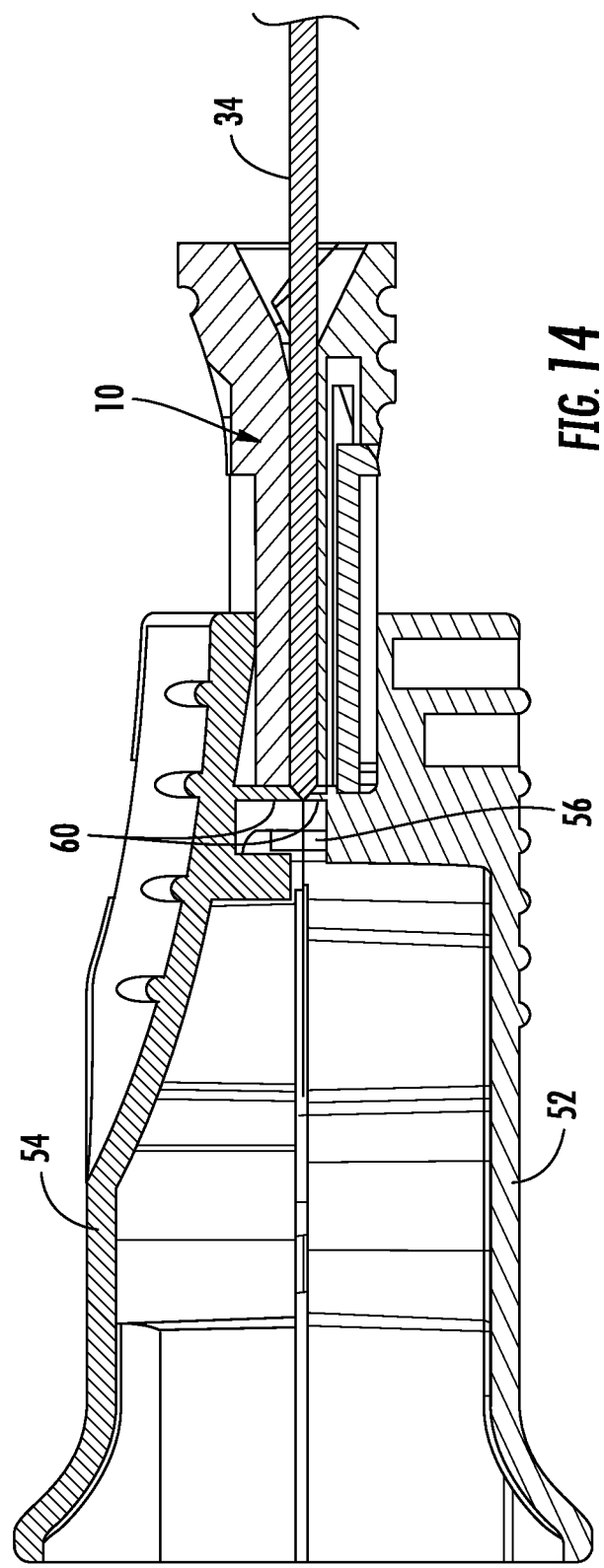

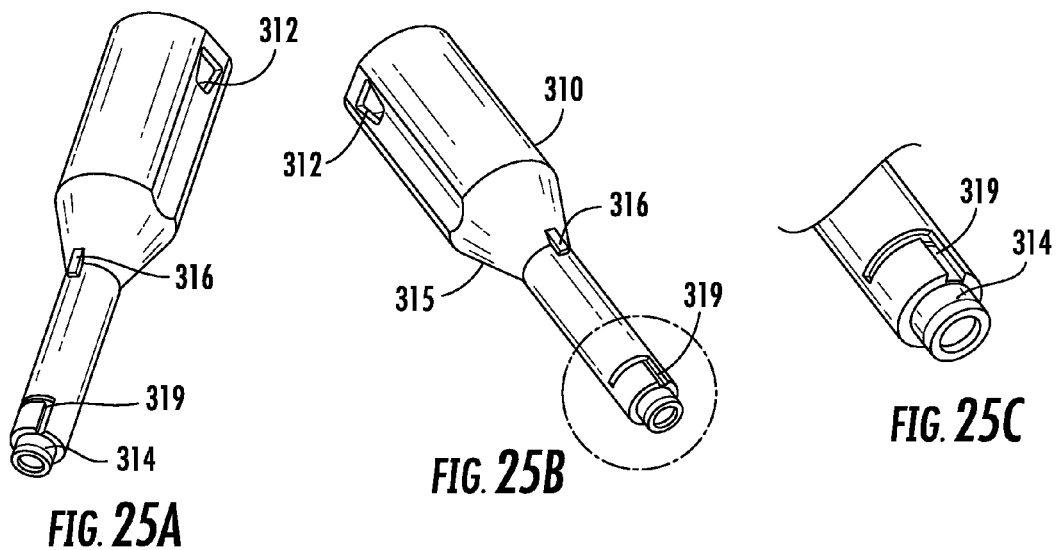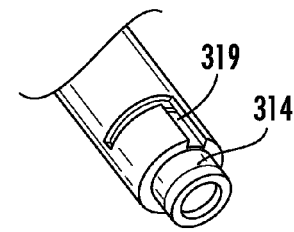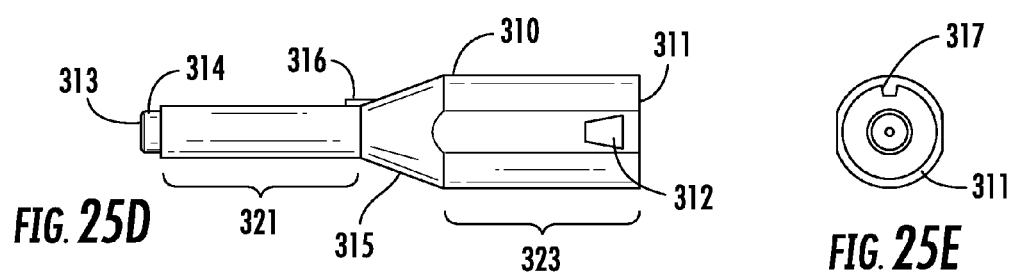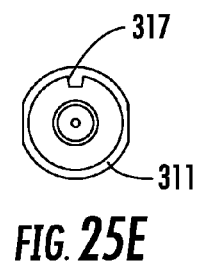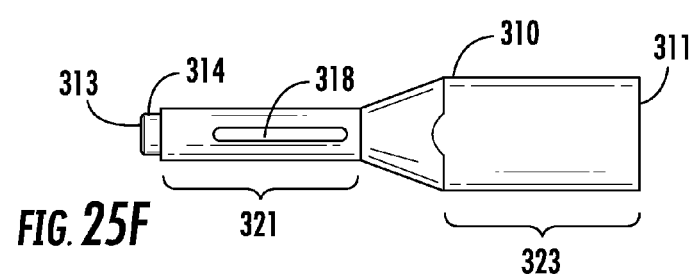

OPTICAL FIBER HANDLER FOR A FIBER OPTIC CONNECTION TERMINATION SYSTEM

RELATED APPLICATIONS

This application claims the benefit of U.S. Provisional Application No. 61/295,467 filed on Jan. 15, 2010, the entire contents of which are hereby incorporated by reference.

BACKGROUND

The disclosure is directed to a termination system and components thereof for making a fiber optic connection in a quick, easy, and reliable manner. Specifically, the termination systems disclosed use an optical fiber handler that attaches to an optical fiber or buffer layer of the optical fiber and cooperates with other components for preparing the optical fiber and/or making a mechanical splice optical connection.

Optical fiber is increasingly being used for a variety of applications in both public and private networks for broadband voice, video, data transmission, and the like. Benefits of optical fiber use include extremely wide bandwidth and low noise operation. With the increasing and varied use of optical fibers, it is important to provide efficient methods of interconnecting and reconfiguring optical fiber pathways. Fiber optic connectors that mate using an adapter have been developed for this purpose. It is important that fiber optic connectors not significantly attenuate or alter the transmitted signal. Fusion-splicing is one method of providing an optical connector on an end of a cable. Specifically, a factory-polished optical fiber connector pigtail may be fusion-spliced to an end of a fiber optic cable. However, fusion splicing requires a fusion splicer and training for the craftsman.

To overcome the need for a fusion splicer and training, fiber optic connectors were developed that allow a mechanical splice in the field. However, the quality of the mechanical splice can vary widely depending on the design of fiber optic connector, preparation of the optical fiber, alignment of the fibers, installation by the craft, etc. For instance the craft may need to remove buffer layers from the optical fiber and then remove a coating on the optical fiber. Thereafter, the optical fiber may require cleaving to the appropriate length for insertion into the mechanical splice connector. If the optical attenuation of the field splice is too high, the craftsman needs to reconnect the fiber optic connector to achieve a desirable result. For these reasons, termination of fiber optic cables with a simple, reliable, and easy to assemble manner is challenging, especially for the unskilled craftsman. Thus, there is an unresolved a need for a robust fiber optic cable termination that is simple, reliable, and easy to assemble.

SUMMARY

Termination systems and devices disclosed herein use an optical fiber handler that attaches to the optical fiber or buffer layer of an optical fiber and cooperates with other components such as one or more fiber preparation tools for preparing the optical fiber and/or making the optical connection, thereby providing a simple, reliable, and easy termination for the optical fiber (i.e., optical connection). For instance, the handler may cooperate with one or more of the following a strip tool, strip/clean tool, cleave tool for preparing the end of the optical fiber(s), and/or a mechanical splice connector for making the optical connection.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character as it is claimed. The accompanying drawings are included to provide a further understanding, and are incorporated into and constitute a part of this specification. The drawings illustrate various embodiments, and together with the description serve to explain the principles and operation.

BRIEF DESCRIPTION OF THE FIGURES

FIG. 5 is an exploded view of the optical fiber handler of FIG. 1;

FIGS. 6 and 7 respectively show a perspective and rear end view of the optical fiber handler of FIG. 1 with the optical fiber inserted therein and before securing the same;

FIG. 14 depicts a cross-sectional view of the optical fiber stripper of FIG. 8 being used to strip one or more coatings of an optical fiber secured in the optical fiber handler of FIG. 1;

FIGS. 25A-25F depicts various detailed views of the ferrule holder of FIG. 24;

DETAILED DESCRIPTION OF THE PREFERRED EMBODIMENTS

Reference will now be made in detail to the preferred embodiments, examples of which are illustrated in the accompanying drawings. Whenever possible, like reference numbers will be used to refer to like components or parts. Embodiments described herein are explanatory methods and devices for preparing and/or terminating an end portion of a fiber optic cable. Moreover, the concepts disclosed advantageously allow for easily repeatable and reliable terminations by the craft. Reference will now be made in detail to the preferred embodiments, examples of which are illustrated in the accompanying drawings. Whenever possible, like reference numbers will be used to refer to like components or parts.

Figure 1:
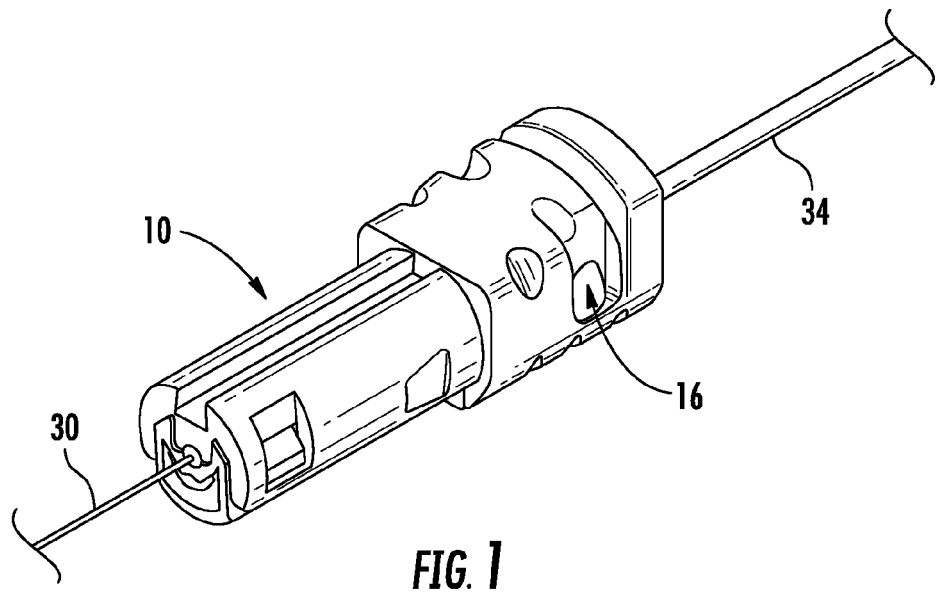
FIG. 1 is a perspective view of one explanatory optical fiber handler that is attached to an optical fiber.

FIG. 1 is a perspective view of explanatory optical fiber handler 10 (hereinafter handler) that secures one or more optical fibers 30 thereto. Optical fiber 30 may include one or more protective layers such as a buffer layer 34 disposed over optical fiber 30, but other constructions are possible having a cable jacket or the like. As shown in FIG. 1, optical fiber 30 has buffer layer 34 already removed from the portion that extends beyond the front end (i.e., the left side) of handler 10 and is ready for cleaving to a suitable length for termination as will be discussed herein.

Handler 10 is advantageous, because it makes field termination simple, quick and reliable for the craft. As shown, handler 10 is secured to buffer layer 34 of optical fiber 30 and the optical fiber 30 extends from a front end of the handler 10, thereby allowing the handler 10 to engage one or more other devices (e.g., fiber preparation tools) for optical fiber preparation and/or termination as discussed herein. By way of example, typical method steps include inserting the optical fiber into the handler, securing the optical fiber to the optical fiber handler, stripping the buffer and/or optical fiber coating(s), and cleaving the optical fiber to length. Thereafter, handler 10 can interface with an optical fiber connector for making a mechanical splice and becoming part of the termination. Thus, the handlers disclosed herein are useful for making preparation of the optical fiber and termination of the same simple, easy, and repeatable even for untrained personnel. In other variations, handler 10 can be secured directly to the optical fiber or to a cable jacket.

Figure 2:
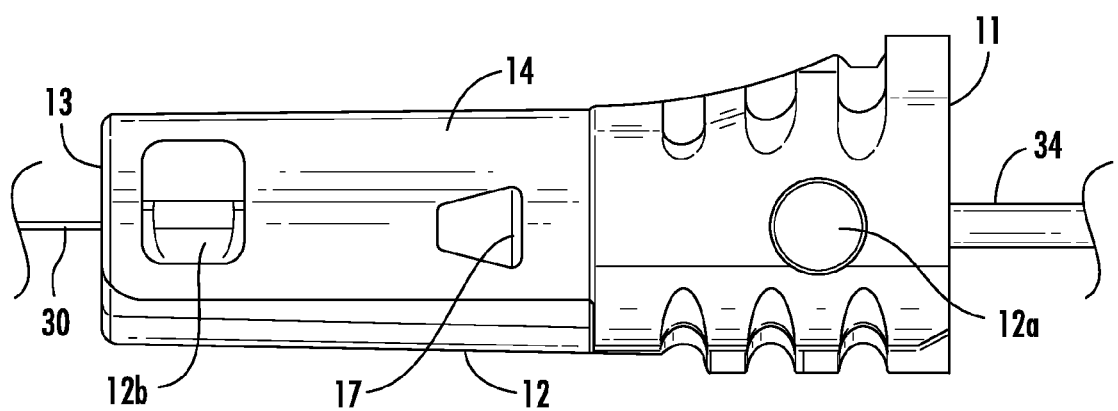
FIGS. 2-4 show various views of the optical fiber handler of FIG. 1.
Figure 3:
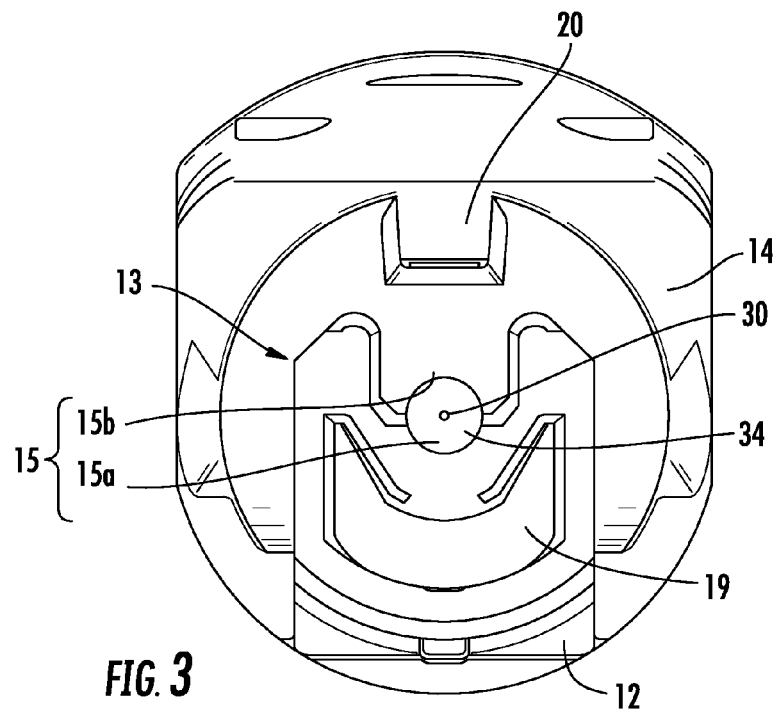
Figure 4:
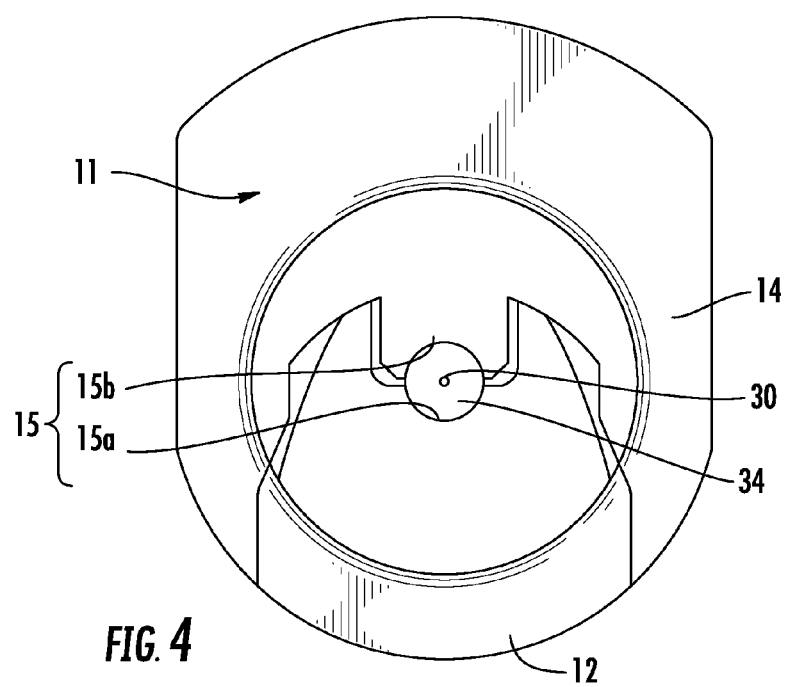

FIGS. 2-4 show various views of handler 10 secured to optical fiber 30 and FIG. 5 depicts an exploded view of the same. More specifically, FIGS. 2-4 respectively depict a side view, a front end view and a rear end view of handler 10. Handler 10 includes a first portion 12 and a second portion 14 that are attached together. The second portion 14 can pivot relative to the first portion 12 (or vice versa) and the handler 10 defines a passageway (not numbered) extending therethrough from a first end 11 to a second end 13 of the handler 10 for receiving optical fiber 30 therein. Handler 10 can secure the at least one optical fiber 30 thereto by pivoting the first portion 12 relative to the second portion 14 for clamping onto the optical fiber, buffer layer, etc. Specifically, handler 10 has a pivot point 16 adjacent to one end and a latching portion 18 adjacent to the other end for securing the first portion 12 to the second portion 14. In this embodiment, pivot point 16 is adjacent to a rear end and latching portion 18 is adjacent to a front end of handler 10; however, this arrangement could be reversed in other embodiments. Moreover, locating the pivot point 16 on the opposite end of the latching portion 18 provides mechanical advantage so that the handler 10 can be closed to secure the optical fiber thereto without using a tool. In other words, the craft can easily secure handler 10 to the optical fiber 30 using finger pressure. Further, a part of the first portion 12 fits within a part of the second portion 14 when the handler is either the open or closed position, thereby creating a relatively compact design.

In this embodiment, first portion 12 of handler 10 includes at least one pivot boss 12a at the pivot point 16. Likewise, second portion 14 of handler 10 includes at least one pivot retaining feature 14a such as a pivot aperture at the pivot point 16 for receiving the pivot boss 12a. More specifically, this embodiment includes two pivot bosses 12a disposed on opposite sides of first portion 12 that cooperate with the two pivot retaining features 14a on opposite sides of second portion 14, thereby allowing first portion 12 to snap-fit together with second portion 14. Pivot retaining features 14a may be any suitable feature such as an aperture, recess, or the like. Consequently, the first portion 12 and second portion 14 can pivot at the pivot point between an open position and a closed position. First portion 12 also includes at least one latching boss 12b that cooperates with a latching retaining feature 14b of second portion 14 such as a latching window or recessed portion to keep the handler in a closed position when desired. Specifically, this embodiment includes two latching bosses 12b disposed on opposite sides of first portion 12 that cooperate with the two latching retaining features 14b on opposite sides of second portion 14, thereby allowing first portion 12 to snap-fit with second portion 14 when pivoted to a closed position.

In this embodiment, handler 10 arranges the pivot axis of pivot point 16 so that it is generally perpendicular to the passageway for the optical fiber. However, other embodiments could pivot the first and second portions along a pivot axis that is generally parallel to the passageway for the optical fiber such as connecting the first and second portions using a living hinge or two separate pieces that snap-fit together. Additionally, handler 10 includes a shape and/or gripping surface (not numbered) such as flared at the rear end along with scallops in both portions for sure gripping of the handler by the craft. Likewise, the shape, design, and functionality allow the craft to easily prepare the termination in low-light conditions since viewing the process is not necessary once familiar with the termination procedure.

Handler 10 may be configured to secure a bare optical fiber, a coated optical fiber, or an upcoated optical fiber such as a buffered optical fiber. In other words, the passageway (not numbered) of handler 10 defines a clamping portion 15 that may be sized for securing an optical fiber having the optical fiber coating removed (e.g., a 125 micron optical fiber), an optical fiber with the coating thereon such as a 250 micron optical fiber (i.e., with the coating applied during the drawing process still on the optical fiber) or an upcoated optical such as a 900 micron optical fiber (i.e., a coating applied over the optical fiber coating), but other suitable sized optical fibers may be secured by the handler as desired. In this embodiment, the clamping portion 15 is configured to accommodate a variety of sizes such as 250 micron optical fiber or an upcoated optical fiber. Other embodiments could be sized for clamping to a cable jacket of the optical fiber. As shown, clamping portion 15 is formed by an arcuate portion 15a (i.e., a grooved portion) on first portion 12 and an arcuate portion 15b on second portion 14 that cooperate to clamp the optical fiber. In this embodiment, the arcuate portion 15a (i.e., grooved portion) runs over a majority of the length of first portion 12 for helping center and guide the optical fiber 30 into the handler 10. Additionally, first portion 12 has a tapered portion (not numbered) at the rear end for guiding the insertion of the optical fiber into the passageway and arcuate portion 15a as best shown in FIGS. 4 and 7.

Handler 10 may also include a keying feature 20 such as a slot or protrusion for orientating or preliminary alignment of the handler with another structure such as a fiber preparation tool or a fiber optic connector. Likewise, keying feature 20 makes sure that the parts have the correct orientation with other structures and/or limits rotation for providing mechanical robustness/inhibiting damage. Keying feature 20 may be disposed on either the first portion 12 or the second portion 14. In this embodiment, keying feature 20 is a slot disposed on the second portion 14. Handler 10 also includes at least one boss 17 for attaching the handler 10 to another structure such as the optical fiber connector or fiber preparation tool. In this embodiment, boss 17 is disposed on second portion 14 at an outer surface of the handler 10. Moreover, handler 10 can cooperate with at least one fiber preparation tool for preparing the at least one optical fiber for termination as discussed below. By way of example, handler 10 may interface with an optical fiber stripper for removing one or more coatings from an optical fiber secured by the handler.

Additionally, optical fiber handlers may include an optional fiber guide for protecting the optical fiber extending from the same. This embodiment includes a fiber guide 19 as best shown in FIG. 5. Fiber guide 19 is movable along a longitudinal direction of handler 10 and into a cavity of first portion 12. In other words, fiber guide 19 is retractable into first portion 12 as a small force is applied to the same. Moreover, fiber guide 19 may be biased in an outward direction (i.e, sticking out of the handler) using a resilient member 22.

FIGS. 6 and 7 respectively show a perspective and rear end view of handler 10 in the open position with the optical fiber 30 inserted therein. Simply stated, with the handler 10 in the open position the optical fiber 30 is inserted into the passageway a suitable distance. After optical fiber 30 is inserted into handler 10 the second portion 14 is pivoted downward to the closed position as represented by the arrow for securing optical fiber 30 therein. Additionally, FIG. 6 shows fiber guide 19 biased in the outward direction.

Figure 8:
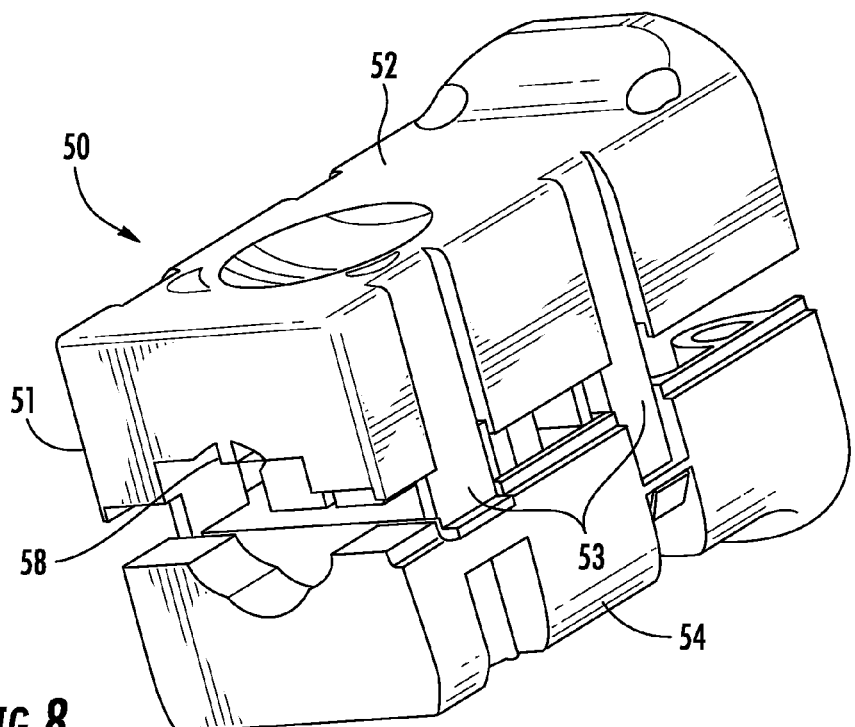
FIG. 8 is a perspective view of an optical fiber stripper.

FIG. 8 is a perspective view of an optical fiber stripper 50 (hereinafter stripper) used for removing one or more coatings from optical fiber 30. For instance, stripper may be used for removing the buffer layer 34 and/or a coating (not visible) on optical fiber 30. Stripper 50 includes a top portion 52 and a bottom portion 54. The bottom portion 52 attaches to the top portion 54 and can translate relative to the bottom portion 52 from an open position (FIG. 8) to a closed position to grip the optical fiber therein. For instance, stripper 50 includes a plurality of latches 53 for attaching the top portion 54 to the bottom portion 52. Additionally, stripper 50 can cooperate with handler 10 at a receiving end 51. Still further, stripper 50 may include a keying feature 58 for orientating handler 10 at receiving end 51 using keying feature 20 of the handler 10 (i.e., the keying feature 58 and keying feature 20 are aligned for orientating the structures).

Figure 9:
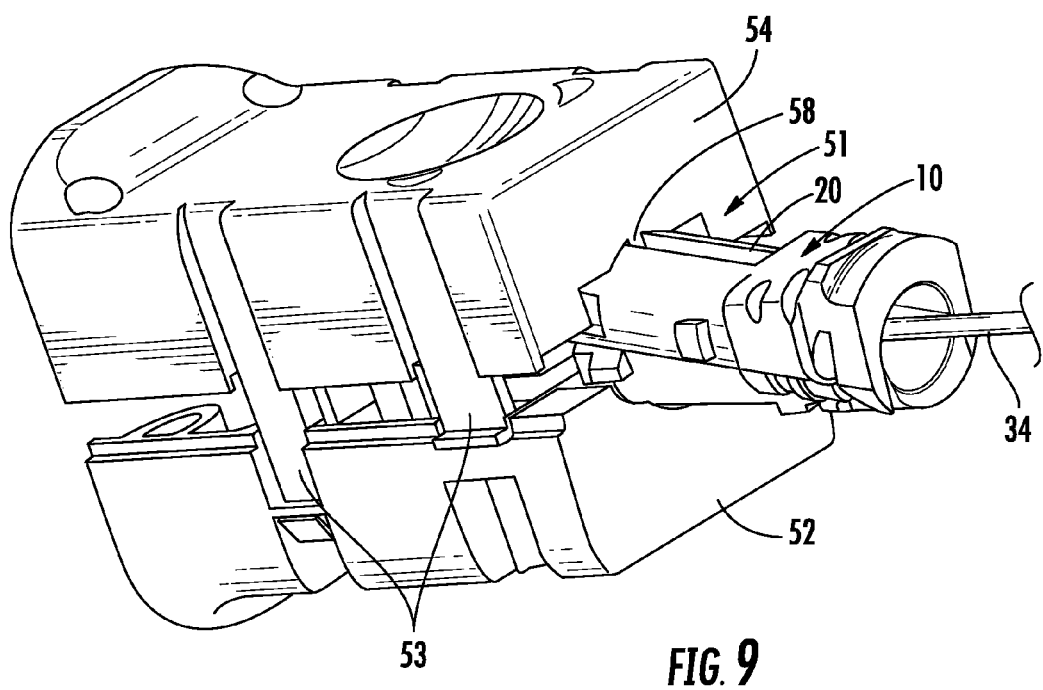
FIGS. 9-11 illustrate the use of the optical fiber stripper of FIG. 8 being used with the optical fiber handler of FIG. 1 to strip one or more coatings from the optical fiber.
Figure 10:
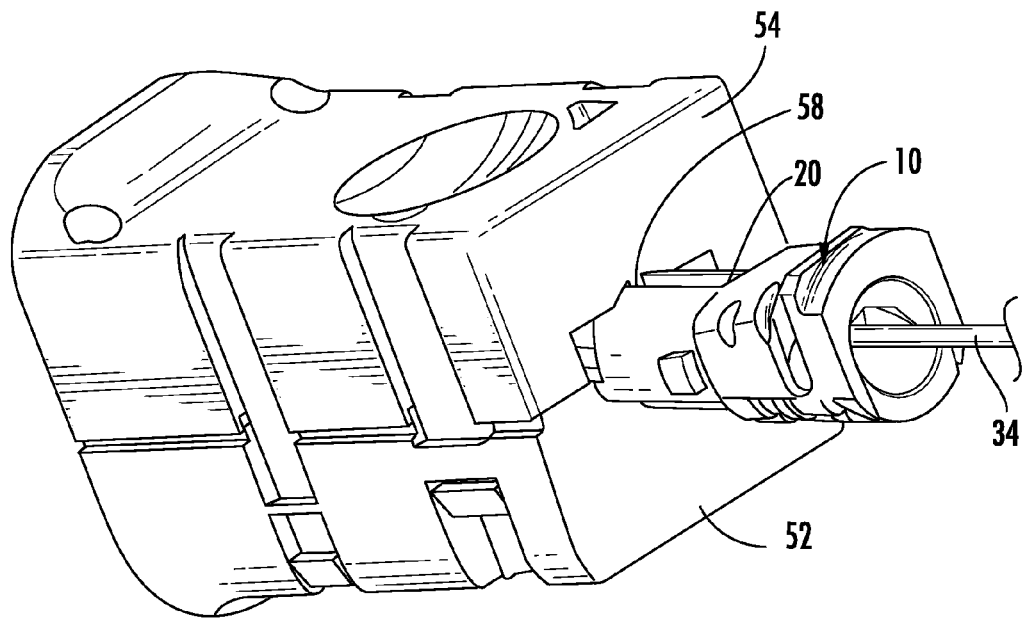
Figure 11:
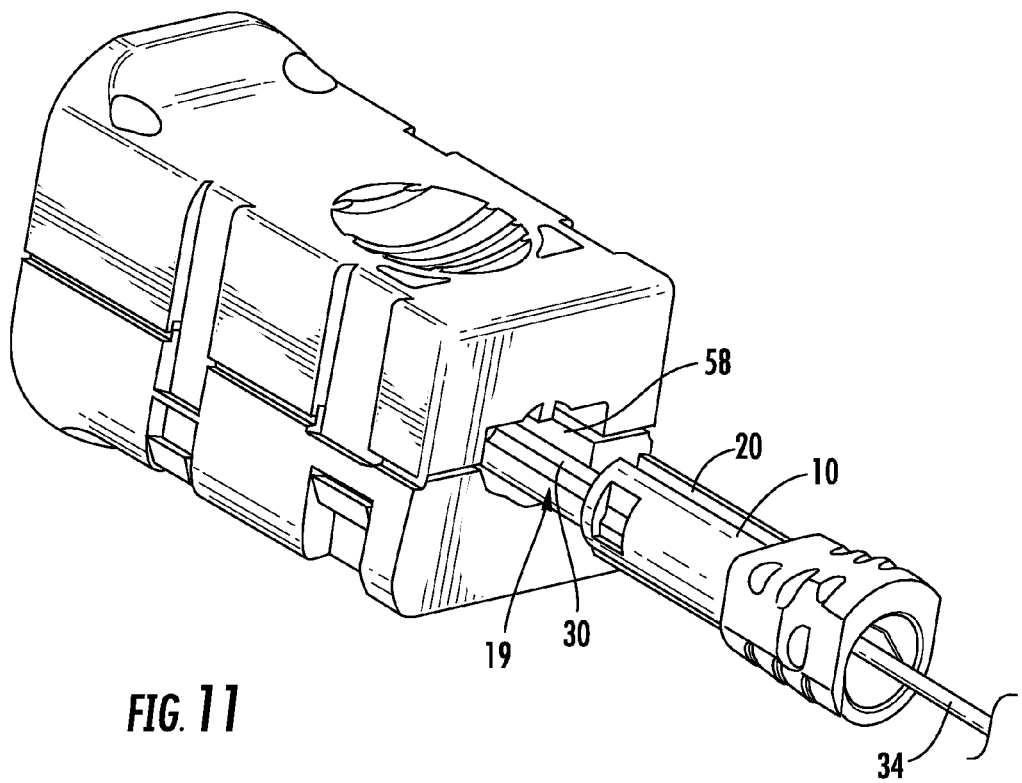

FIGS. 9-11 illustrate the use of stripper 50 being used with handler 10 to strip one or more coatings from the optical fiber. FIG. 9 illustrates the handler 10 being pre-loaded or staged in the stripper 50 (i.e., a fiber preparation tool) for ease by the craft in stripping one or more coatings from the optical fiber 30. Additionally, the handler 10 can have a light friction fit or positive engagement with the stripper 50 for retaining the same if pre-loaded therein. However, handler 10 does not need to be pre-loaded within stripper 50. Likewise, other suitable alternative tools or methods may be used to strip, cleave, or otherwise prepare the optical fiber for termination or may be performed before securing the optical fiber to the handler. Specifically, FIG. 9 depicts the handler 10 pre-loaded in stripper 50 where both the handler 10 and the stripper 50 are in the open position before one or more coatings are stripped from the optical fiber 30. After optical fiber 30 is inserted into the handler 10 and into the stripper 50 by a suitable distance such as extending to the far end of the stripper 50, the stripper 50 can be closed by moving the top portion 54 and bottom portion 52 together. The overall length of stripper 50 can be selected to function as a stripping gauge or fiber measurement guide. In other words, when the craft views the optical fiber lining up with or extending from a far end of the stripper 50 they know a suitable length of the optical fiber is being stripped for the termination and connectorization process (i.e., cleaving and connectorization). Moving the top portion 54 and bottom portion 52 together also closes the handler 10 and secures the optical fiber 30 to the handler 10 as shown in FIG. 10. Additionally, moving the top portion 54 and bottom portion 52 together brings the optical fiber 30 into the proper location within the stripper 50 for stripping the one or more coatings therefrom as discussed below. Thereafter, the handler 10 can be pulled away from stripper 50 to remove the one or more coatings from the optical fiber as shown in FIG. 11.

Figure 12:
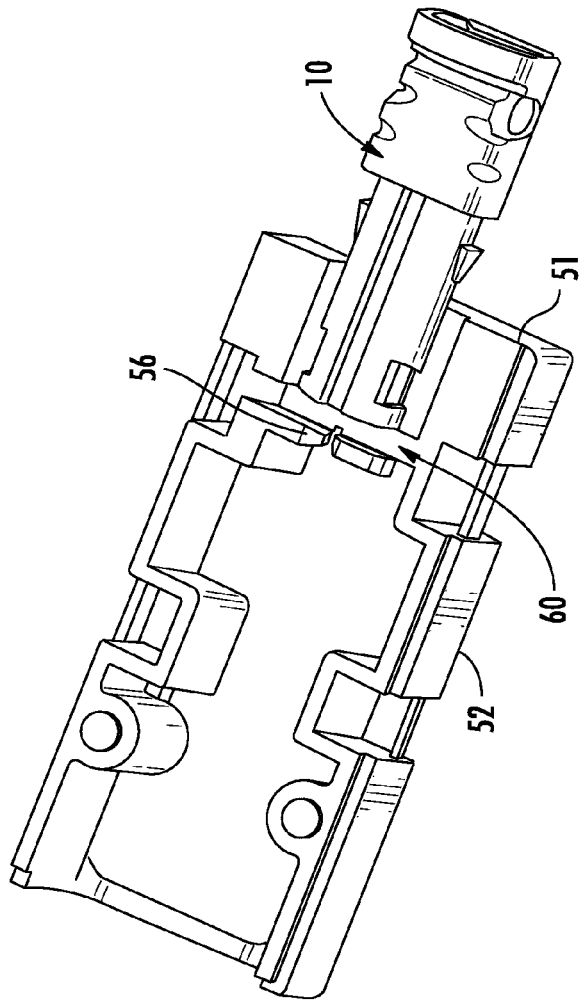
FIG. 12 depicts a bottom portion of the optical fiber stripper of FIG. 8 showing the internal details along with the optical fiber handler of FIG. 1 disposed therein.
Figure 13:
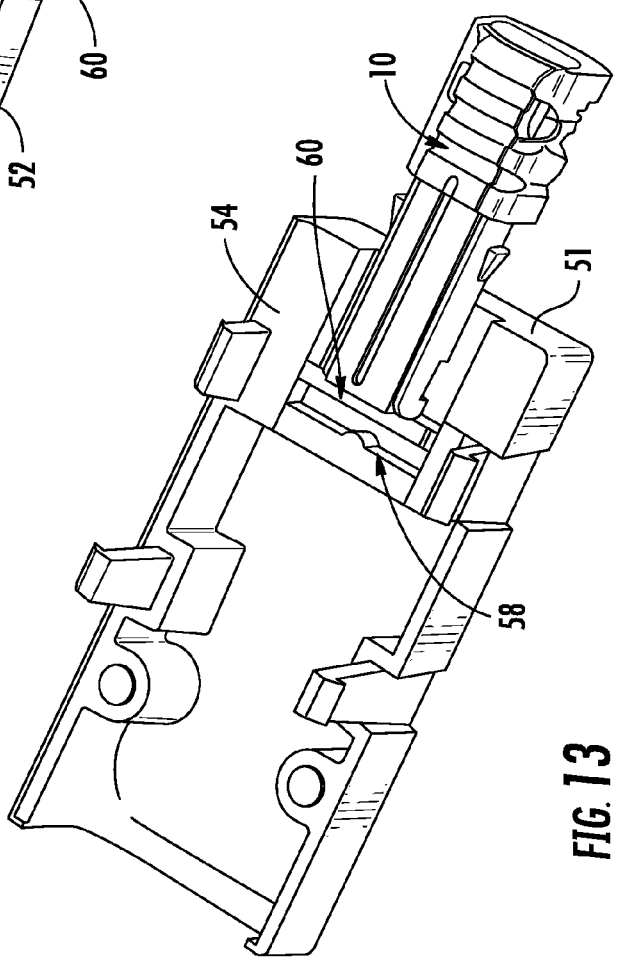
FIG. 13 depicts a top portion of the optical fiber stripper of FIG. 8 showing the internal details along with the optical fiber handler of FIG. 1 disposed therein.

FIGS. 12 and 13 respectively depict the bottom portion 52 and top portion 54 of stripper 50 along with the handler 10 disposed in each portion therein showing the respective internal details of the portions. One of the top portion 54 or the bottom portion 52 includes a fiber slot 56 and the other portion includes a pushing surface 58 for advancing the optical fiber into the fiber slot 56. A first stripping edge 60 is disposed adjacent to the fiber slot 56 toward the receiving end 51. Likewise, a second stripping edge 60 is disposed adjacent to the pushing surface 58 toward the receiving end 51. In this embodiment, the top portion 54 and bottom portion 52 translate in a linear direction (i.e., in the direction of the fiber slot 56) when pushed together, but other embodiments can translate the portions in another direction such as rotational or the like. For instance, the top portion and bottom portion may translate in a rotational manner about a living hinge connecting respective sides of the portions. Additionally, stripper 50 includes a stop 59 so that handler 10 is inserted a predetermined distance relative to stripping edges 60. In this embodiment, stop 59 allows abutment of the front end of handler 10 adjacent to the stripping edges 60 as shown.

FIG. 14 depicts a cross-sectional view of stripper 50 cooperating with handler 10 to strip one or more coatings from the optical fiber 30. When top portion 54 and bottom portion 52 are closed onto the optical fiber, the pushing surface 58 pushes the optical fiber into the fiber slot 56. FIG. 14a shows a detailed cross-sectional view of fiber slot 56 and pushing surface 58 in the closed position. Pushing the optical fiber into fiber slot 56 induces a stress on the upcoating thereby allowing the formation of a break point on the upcoating such as the buffer layer (i.e., initiates a fracture) on the optical fiber if one is present. In other words, the upcoating has a stressed induced therein when pushed into the fiber slot 56 and then the upcoating is broken when moved a distance by pulling the handler 10 from the stripper 50 during the stripping process. As shown in this embodiment, pushing surface 58 may include a convex portion (not numbered) facing receiving end 51 that cooperates (i.e., has a complementary shape) with a concave portion of the fiber slot 56. This arrangement of the convex and concave portions allows a close fit between the pushing surface 58 and the fiber slot 56, thereby guiding and forcing the optical fiber into the fiber slot 56. Fiber slot 56 can have any suitable shape or geometry for breaking the upcoating (i.e, buffer layer) on the optical fiber.

By way of example, fiber slot 56 has a lead-in portion (i.e., a v-shaped entry) for aligning and centering the optical fiber as it engages the same, thereafter the walls of the slot have a generally parallel orientation to open and separate the upcoating on the optical fiber. Moreover, when stripper 50 is in the closed position the fiber slot 56 fits between the pushing surface 58 and stripping edge 60 on the other portion. Consequently, the portion of the upcoating on the optical fiber being removed is held within fiber slot 56 as the craftsman pulls the handler away from the receiving end 51 of stripper 50. In this embodiment, the fiber slot 56 is an integral portion of the top portion 54, but other embodiments can have the fiber slot removably attached to a portion of the stripper for replacement or reconfiguring the stripping sizing. Likewise, this embodiment depicts the first and second stripping edges 60 integrally formed with the respective bottom and top portions 52, 54; however, other embodiments may have the first and second stripping edges 60 that are inserts removably attached respectively to the top and bottom portions 52, 54 so they can be replaced and/or reconfigured for different types of optical fibers.

Figure 14A:
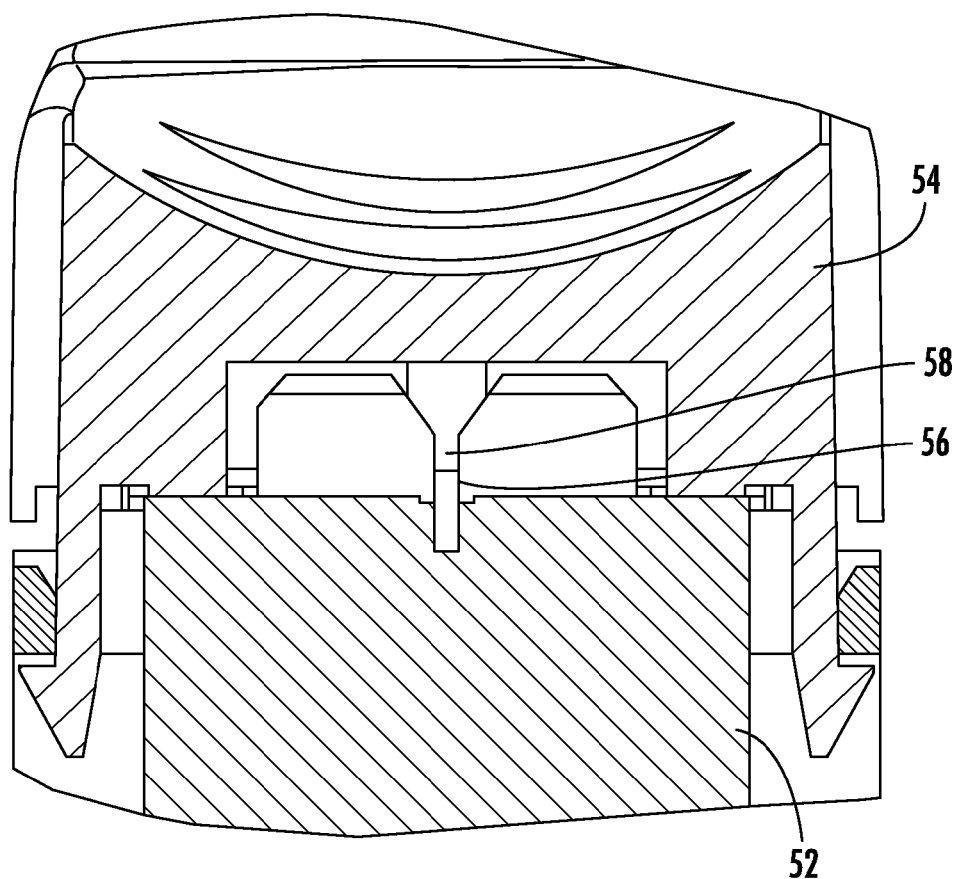
FIGS. 14a-14e respectively show details of a fiber slot and stripping edges of the optical fiber stripper of FIG. 8.
Figure 14B:
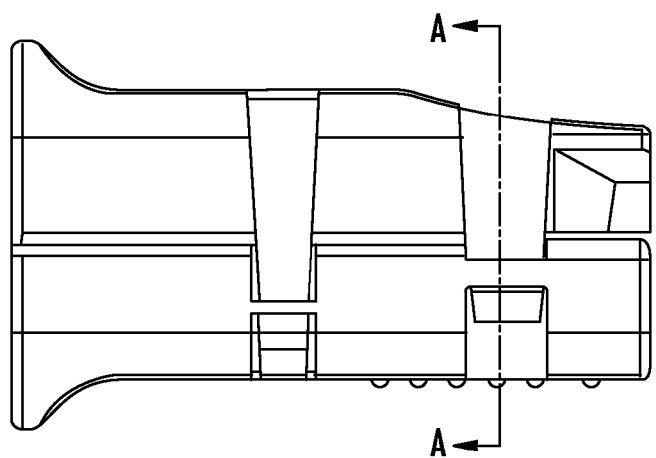
Figure 14C:
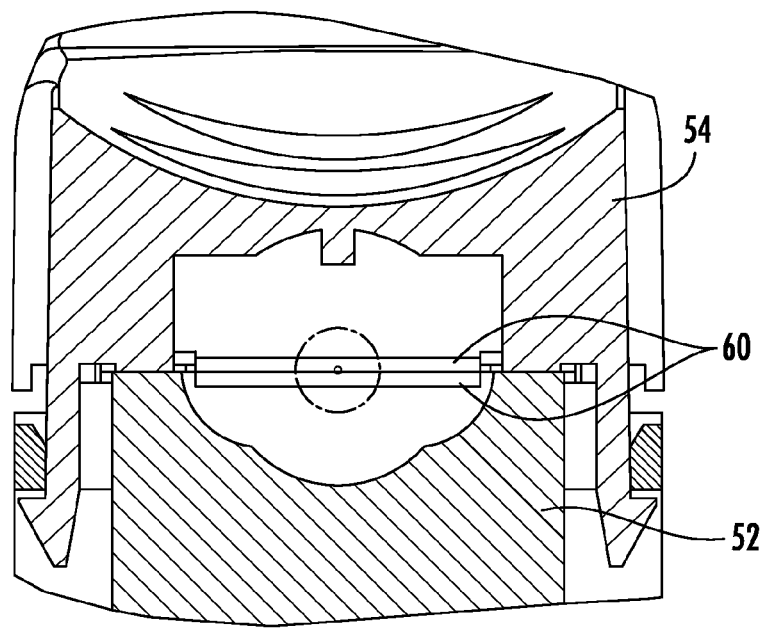
Figure 14D:
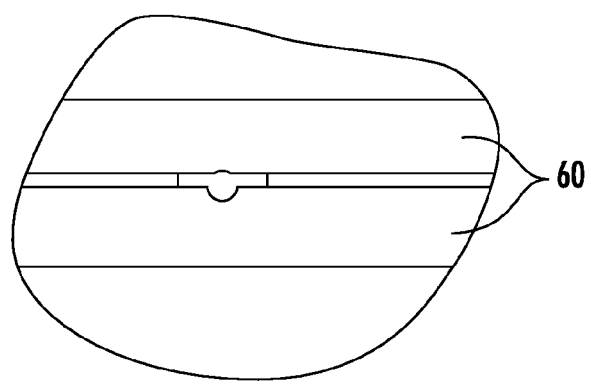
Figure 14E:
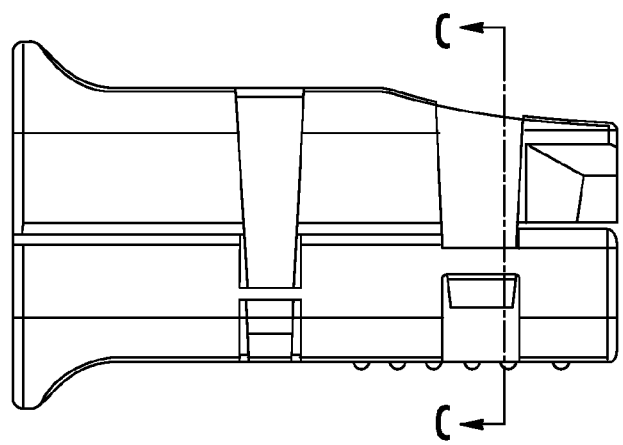

Stripping edges 60 are used for removing the coating of the optical fiber over the desired portion, thereby exposing the bare optical fiber (i.e., the cladding of the optical fiber that surrounds the core). For instance, a typical optical fiber has a 250 micron coating that when removed leaves a 125 micron optical fiber that contains the core and cladding. FIG. 14*b* shows a detailed cross-sectional view of stripping edges 60 in the closed position. In one embodiment, the stripping edges 60 have a planar edge surface and are made from a material that deforms when engaging the optical fiber. In other words, the stripping edges 60 experience a deformation about the optical fiber disposed therebetween so it acts as a wiping surface to remove one or more coatings from the optical fiber. Stated another way, the stripping edges 60 experience a deformation of approximately one fiber diameter therebetween when closed onto the optical fiber so that the edges wipe away the optical fiber coating as the handler is pulled away from stripper 50. For instance, the material used for the stripping edge may have a bending elasticity in the range of about 900 to 20,000 MPa. One suitable material having a bending elasticity in this range is a polycarbonate, but other suitable materials are possible. Additionally, stripping edges 60 may be straight or angled downward towards the receiving end 51 of stripper 50 as shown. In other embodiments, the stripping edges maybe made from a material that does not deform when closed onto the optical fiber, but instead have a profile that accommodates the optical fiber and acts to wipe the coating from the optical fiber.

Figure 15:
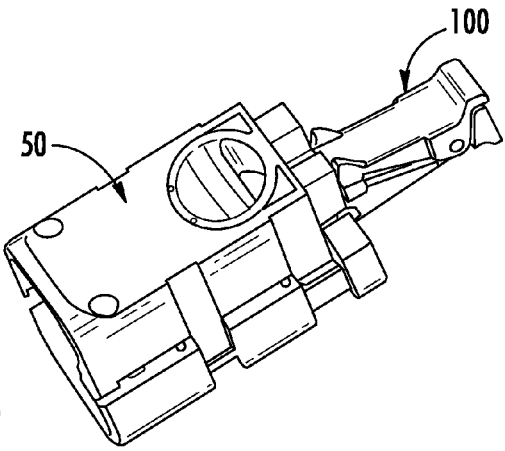
FIGS. 15-22 illustrate the use of the optical fiber stripper of FIG. 8 being used with another optical fiber handler for preparing and making a mechanical splice with a suitable optical fiber connector.
Figure 16:
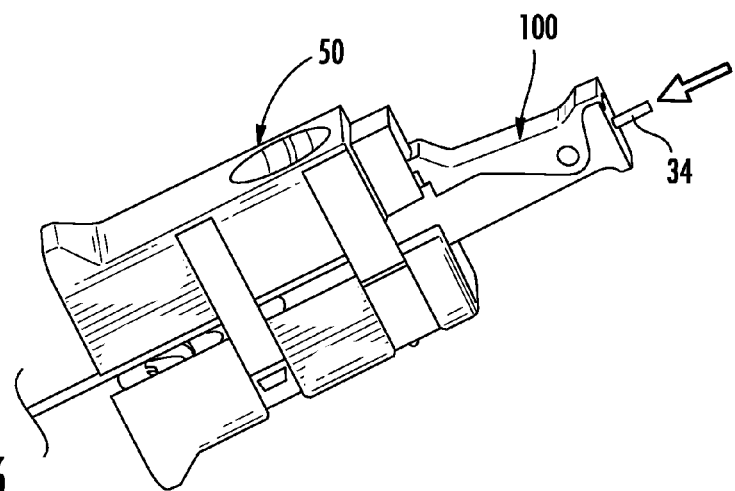

FIGS. 15-22 depict an explanatory method of preparing an optical fiber for termination with a mechanical splice fiber optic connector (hereinafter fiber optic connector) using another handler 100. Handler 100 is used for securing an optical fiber and is similar to handler 10 with some variations as depicted in greater detail in FIG. 31. Of course similar steps could be performed using handler 10 instead of handler 100. FIG. 15 shows handler 100 placed into stripper 50 that is the open position. Handler 100 may be pre-loaded within stripper 50 or positioned therein by the craft with the handler 100 in the open position for receiving optical fiber with the buffer layer 30 thereon. In other variations, an optical fiber without the buffer layer 34 may be inserted into the handler for preparation and termination. FIG. 16 shows the optical fiber with the buffer layer 34 and optical fiber coatings intact being inserted into handler 100 and into stripper 50 as represented by the arrow. Optical fiber 30 is inserted so that it extends to or beyond the distal end of the stripper 50, thereby ensuring that a suitable length of the optical fiber 30 is stripped for termination. Additionally, the steps explained herein may be performed in other sequences. For instance, the optical fiber with buffer layer 34 thereon may be secured in handler 100 before being inserting the assembly into an open stripper 50.

Figure 17:
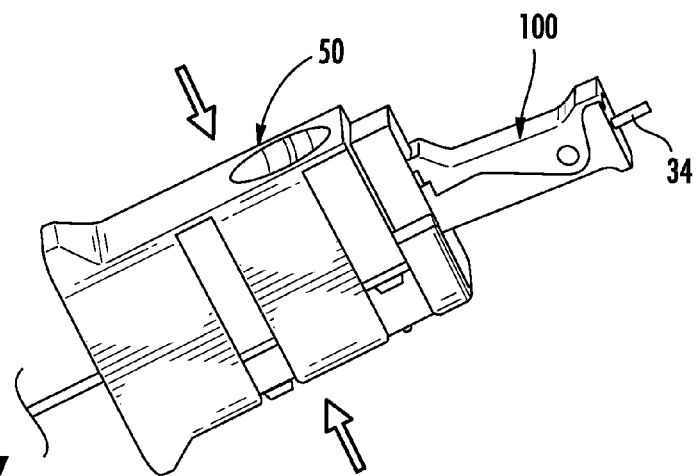
Figure 18:
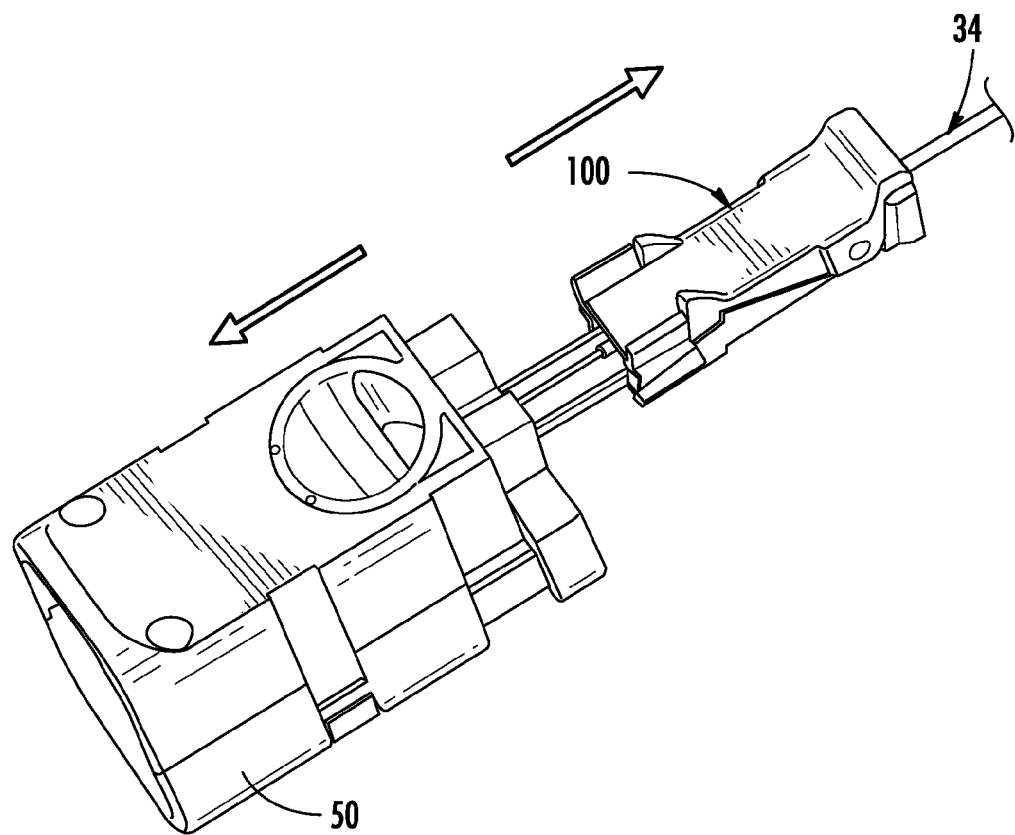

Thereafter, the stripper 50 is closed by translating the top and bottom portions 52, 54 of stripper 50 together as represented by the arrows in FIG. 17. Moreover, closing stripper 50 also closes and secures the optical fiber 30 to handler 100 by forcing the first and second portions thereof together. In one embodiment, the craft knows that the handler secures the optical fiber by a positive feedback such as an audible "click" or other feedback mechanism. Next, FIG. 18 shows the handler 100 being pulled away from the stripper 50 as represented by the arrows, thereby removing one or more coatings from the optical fiber 30. In this embodiment, stripper 50 removes both the upcoating (i.e., the buffer layer 34) and the optical fiber coating (i.e., the 250 micron coating) from the optical fiber leaving the bare optical fiber (i.e., the cladding and core of the optical fiber). As shown, as handler 100 is pulled from stripper 50 the fiber guide (not numbered) of handler 100 extends to protect the stripped optical fiber.

Figure 19:
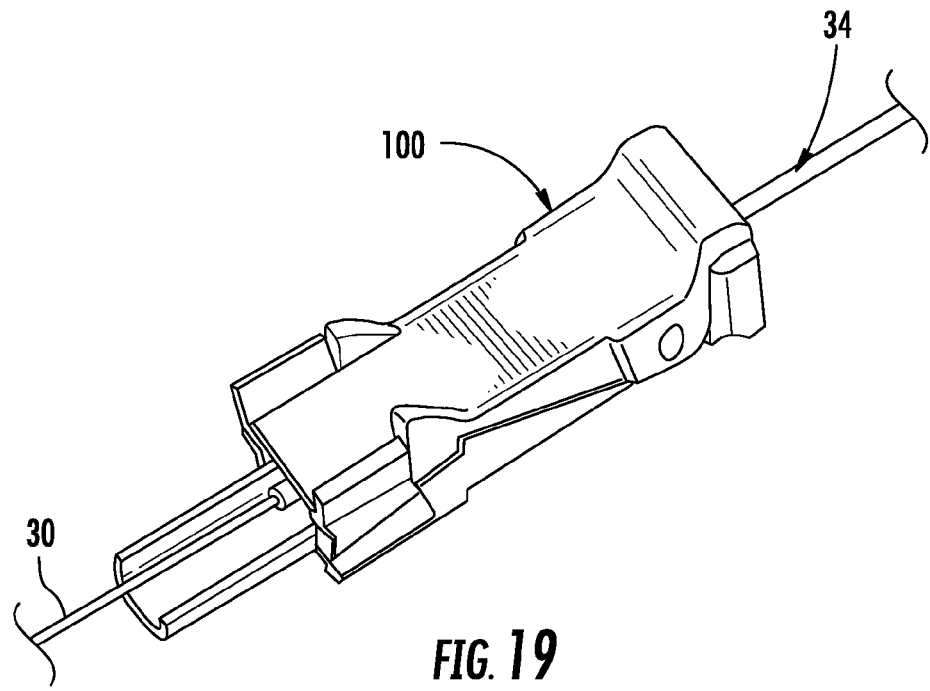

FIG. 19 illustrates handler 100 having the optical fiber with the buffer layer 34 secured therein with the stripped portion of optical fiber 30 extending at the front end of handler 100. Moreover, the handler provides strain relief for the optical fiber and a boot is not necessary for the protecting same; however, a boot may be used with the handler if desired.

Figure 20:
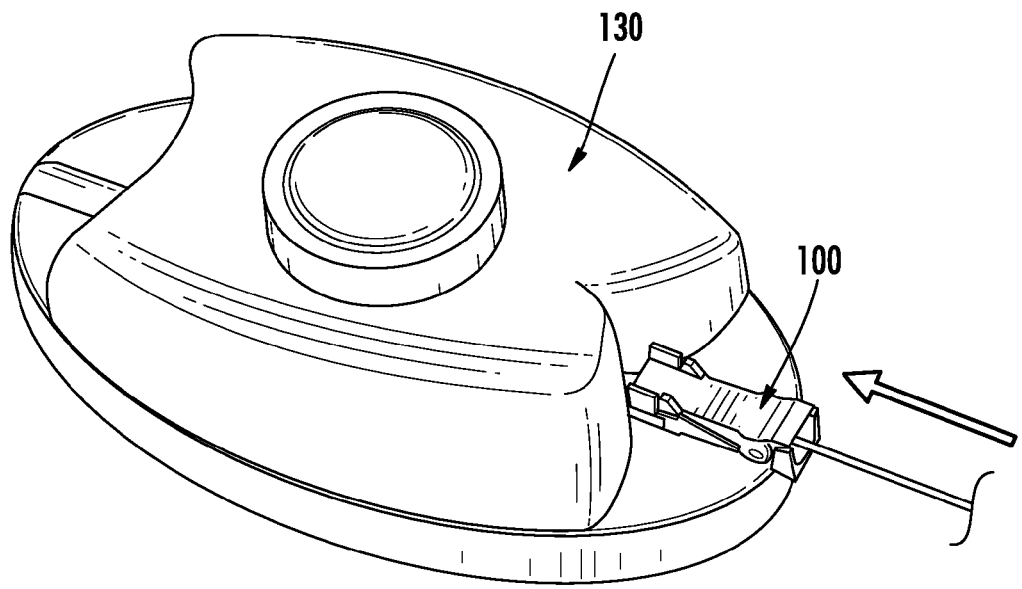
Figure 21:
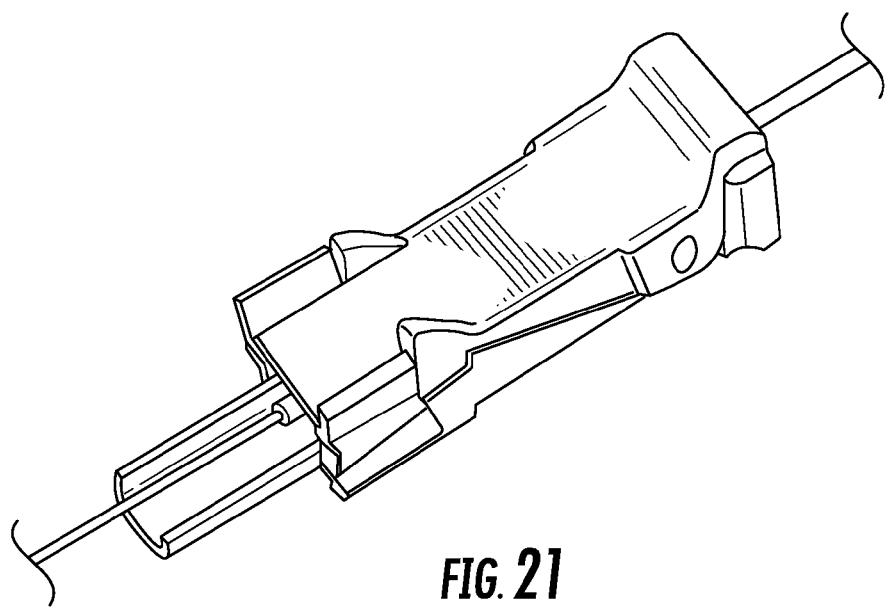

FIG. 20 depicts handler 100 cooperating with another fiber preparation tool. As shown, handler 100 cooperates with a cleaver 130 for preparing (i.e., cutting) the optical fiber secured by the optical fiber handler to a predetermined length. In one embodiment, cleaver 130 can include an interface for aligning and positioning the handler therewith. For instance, the cleaver can have a feature that cooperates with the keying feature of the handler. As shown, the handler 100 is positioned relative to the cleaver 130 as represented by the arrow with the optical fiber in the proper position. The positioning of handler 100 relative to cleaver 130 sets the cleave length of the optical fiber to the proper length for termination with the fiber optic connector. Thus, the craft does not need to take the time to measure and mark the optical fiber for the correct cleave length, but manual procedures such as measuring and marking may be used if a suitable tool such as cleaver 130 is not accessible. After handler 100 is positioned in the correct location in the cleaver 130, the button or activation mechanism of cleaver 130 is pressed to cleave the optical fiber to the correct length.

Figure 22:
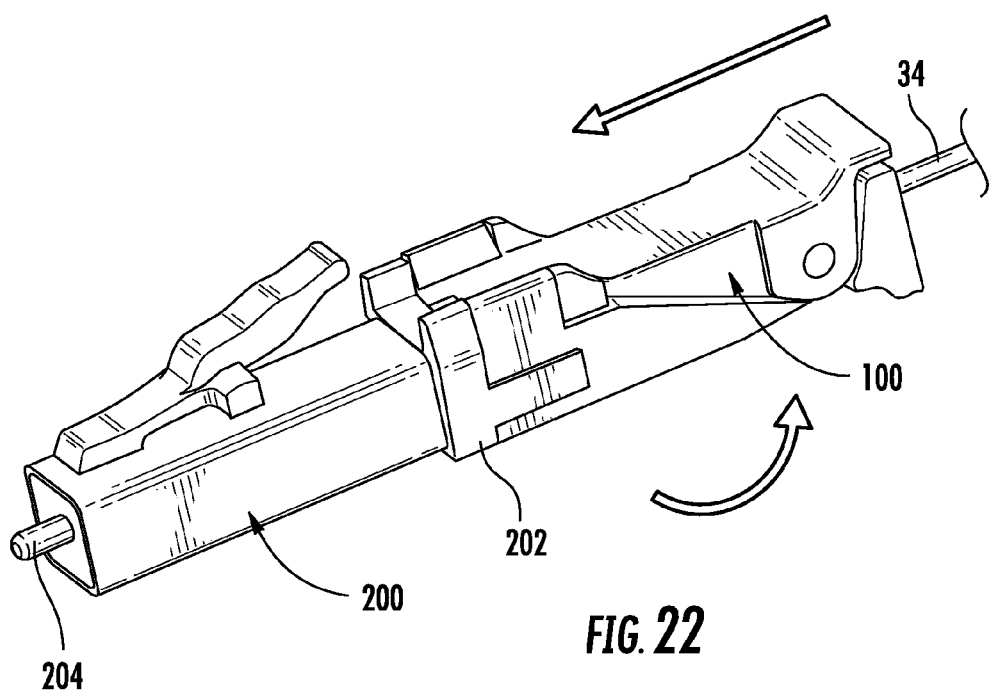

FIG. 22 shows a completed termination where the handler 100 is attached to a fiber optic connector 200 to form a portion of the same. Handler 100 is attached to a portion of the fiber optic connector 200 (i.e., the back end) such as with a snap-fit or the like. Fiber optic connector 200 includes an optical fiber ferrule 204 having a stub optical fiber 206 for mechanical splicing with the optical fiber secured in handler 100. Further, fiber optic connector 200 includes a ferrule holder (not visible) having at least one splice part therein for securing the mechanical splice between the optical fibers. Handler 100 guides the prepared optical fiber into the connector and inhibits damage since it is cleaved to a suitable length. Handler 100 guides the prepared optical fiber into the connector and inhibits damage since it is cleaved to the proper length. Thereafter, the handler, housing, or cam or other suitable structure is activated to activate the internal mechanical splice between the optical fiber held by handler 100 and a stub optical fiber (not visible) of the fiber optic connector 200. Thereafter, the fiber optic connector can be tested for continuity using a suitable test tool.

In the embodiment shown in FIG. 22, handler 100 attaches to an outer portion of fiber optic connector 200, but other embodiments may attach to other portions/components of the fiber optic connector. More specifically, handler 100 attaches to a splice housing 202 the ferrule holder so that when the housing (not numbered) is rotated it activates one or more splice parts within the splice housing 202 from an open position to a closed position, thereby securing the mechanical splice between the optical fibers.

Additionally, the optical fiber extending from the front end of the handler may have a length that is slightly longer than the length from the stub optical fiber to the front end of handler or other reference surface such as the latching boss (i.e., the extending length of optical fiber is longer than the length from the latching boss to the rear end face of the stub optical fiber), thereby inducing a bend in the optical fiber when inserted into the fiber optic connector to ensure physical contact between the stub optical fiber and the optical fiber secured by the handler. In other words, the bend in the optical fiber creates a spring force to push the optical fiber secured in the handler toward the stub optical fiber. Further, the optical fiber handler 100 may be released from the fiber optic connector 200 by the craft to re-position and/or re-secure the optical fiber if necessary. Simply stated, the splice activation mechanism can be reversed to release the clamping force of splice parts on the optical fibers. Then the handler can be removed from the fiber optic connector and the handler opened to release the optical fiber from the handler for repositioning and preparing for another try at preparation and termination. However, other embodiments can be more permanent with a one-shot termination type of design if desired.

Further, the activation mechanism may include a deactivation and/or reactivation feature for allowing the release of the splice parts if the mechanical splice does meet the desired performance level. In other words, the craft can undo the splice by releasing the bias on the splice parts and reposition and/or re-cleave the optical fiber and then reposition/re-insert the optical fiber to make a suitable mechanical splice connection. By way of example, the housing may be rotated relative to the splice housing in one direction to bias the splice parts together and rotation of the splice housing in the other direction releases the bias on the splice parts.

Figure 23:
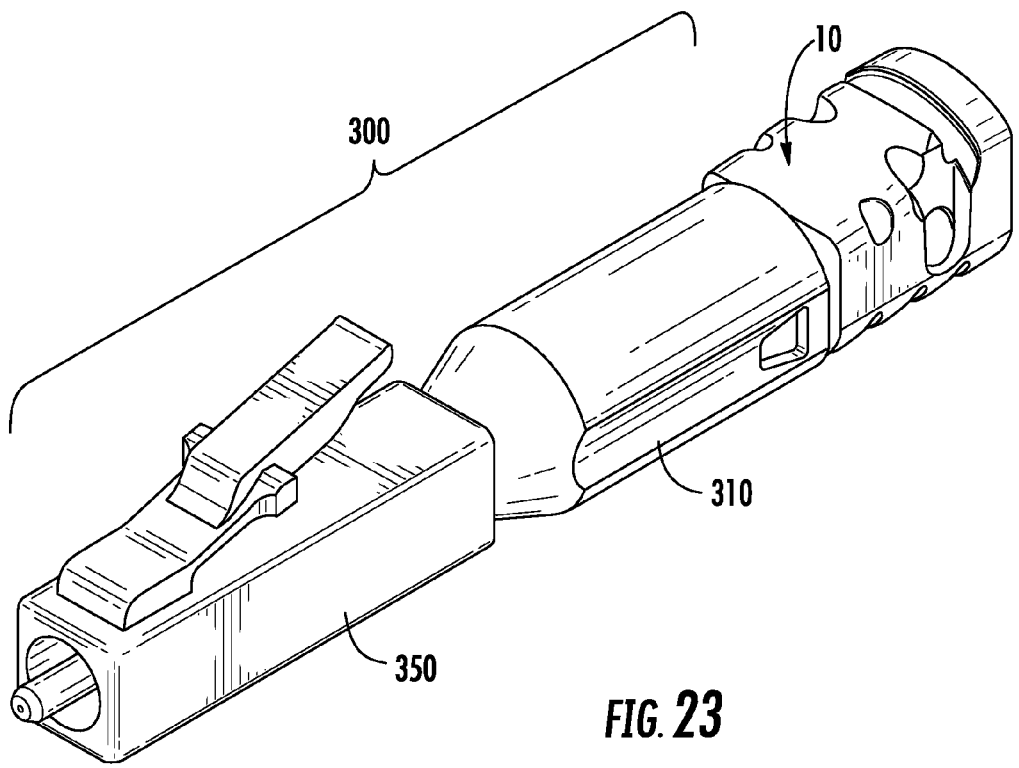
FIG. 23 is a perspective view of an optical fiber connector with the optical fiber holder of FIG. 1 attached thereto.

FIG. 23 is a perspective view of another optical fiber connector 300 with handler 10 attached thereto. Like fiber optic connector 200, fiber optic connector 300 allows the craft to quickly and easily make a mechanical splice termination between the prepared optical fiber 30 secured by the handler and stub optical fiber 206 of the fiber optic connector. As shown by the partially exploded view of FIG. 24, the optical fiber connector 300 includes ferrule 204, stub optical fiber 206, a splice housing 310, a first splice part 320, a second splice part 330, a lead-in 340, and a housing 350. However, other suitable fiber optic connectors can have fewer or more components. As shown, stub optical fiber 206 is secured in ferrule 204 so that a portion extends past the rear end of ferrule 204. Stub optical fiber 206 is secured to ferrule 204 using a suitable adhesive and the front endface of the stub optical fiber 206 and ferrule end face (not numbered) are processes in a suitable manner such as mechanical polishing in the factory, thereby finishing the front end face of the ferrule sub-assembly.

Likewise, the rear end (not numbered) of the stub optical fiber 206 may be processed in any suitable manner to form the rear end face of the stub optical fiber 206. By way of example, the rear end face (not numbered) of the stub optical fiber 206 may be formed by mechanical cleaving or laser processing. Moreover, the rear end face of stub optical fiber 206 may have an angled end face, a curved end face, a flat end face, or combinations thereof. For instance, suitable methods for forming the rear end face of the stub optical fiber 206 are disclosed in U.S. Pat. No. 7,216,512 and/or U.S. patent application Ser. No. 12/339,238 filed on Dec. 19, 2008, the disclosures of which are incorporated herein by reference; however, other suitable methods are possible for forming the rear end face of the stub optical fiber.

FIGS. 25A-25F depicts various detailed views of the splice housing 310 of fiber optic connector 300. Splice housing 310 has a rear end 311 and a front end 313 with a passageway (not numbered) therethrough. The passageway of splice housing 310 receives optical fiber 30 secured by handler 10 from the rear end 311 and stub optical fiber 206 from the front end 313 for making the mechanical splice therebetween within the splice housing 310. Splice housing 310 also includes one or more attachment features 312 for securing handler 10 thereto. In this embodiment, splice housing 310 also functions as a ferrule holder (i.e., the ferrule 204 is secured to the splice housing 310), but other variations of the fiber optic connector can use another component for securing the ferrule 204.

As best shown in FIG. 23, handler 10 is removably secured to splice housing 310. More specifically, a portion of handler 10 is received with in splice housing 310 (i.e., nested therein) and removably secured thereto at a rear portion 323. This embodiment shows that the attachment features 312 of splice housing 310 are one or more windows for receiving respective bosses 17 on handler 10, but other suitable mechanical attachment structures are possible. In other embodiments, the attachment feature(s) 312 of the splice housing 310 may be one or more bosses that attach to one or more respective recess portions on handler 10. As shown, splice housing 310 has a shape that is smaller at the front end 313 compared with the rear end 311, thereby allowing a compact footprint for the connector. For instance, a front portion 321 of the splice housing 310 is attached to the rear portion 323 with a tapered portion 315 therebetween. Moreover, the front portion 321 of splice housing 310 includes a ferrule receiving portion 314 for inserting and securing ferrule 204 thereto. Ferrule 204 may be secured with a friction fit or may use an adhesive or the like to secure the same to splice housing 310.

Splice housing 310 also includes a housing keying portion 316 and handler keying portion 317 as shown. Housing keying portion 316 aids in aligning the housing 350 with splice housing 310 when installing the same and limits rotation of housing 350. Moreover, the housing keying portion 316 ensures that the housing 350 is fully seated onto splice housing before it can be rotated and also acts as a rotational stop as discussed below. Likewise, handler keying portion 317 aids in gross aligning of handler 10 by cooperating with the keying feature 20 of handler 10 and positions the handler 10 in a given orientation with respect with to splice housing 310. Splice housing 310 also include a window 318 in the front portion 321 for allowing a portion of one splice component to extend therethrough.

Splice housing 310 receives one or more splice parts within the passageway which are disposed internally with a front portion 321 of the same. The one or more splice part are secured within splice housing 310 by lead-in 340 which includes a locating feature 340a for inhibiting removal of the same and acts as a stop. In other words, lead-in 340 fits into the passageway of splice housing 310 after the splice part(s) are inserted therein and the locating feature(s) 340a is secured to splice housing 310. Further, the rear end of the lead-in 340 includes a tapered or conical portion for guiding the end of optical fiber 30 through the same and into the splice parts 320,330 as shown in the rear end view. In the illustrated embodiment, two splice parts 320, 330 are shown; however, other embodiment may use a single splice part. By way of example, the shape of splice part 330 may be a molded into the passageway of the splice housing 310 at the front portion 321. The splice housing 310 also includes a rotation feature 319 such as a slot for cooperating with housing 350 as discussed below. Rotation feature 319 of splice housing 310 has a dog leg (i.e., a turn in the slot) as shown for cooperating with housing 350 and rotation of the same as discussed below.

Figure 26:
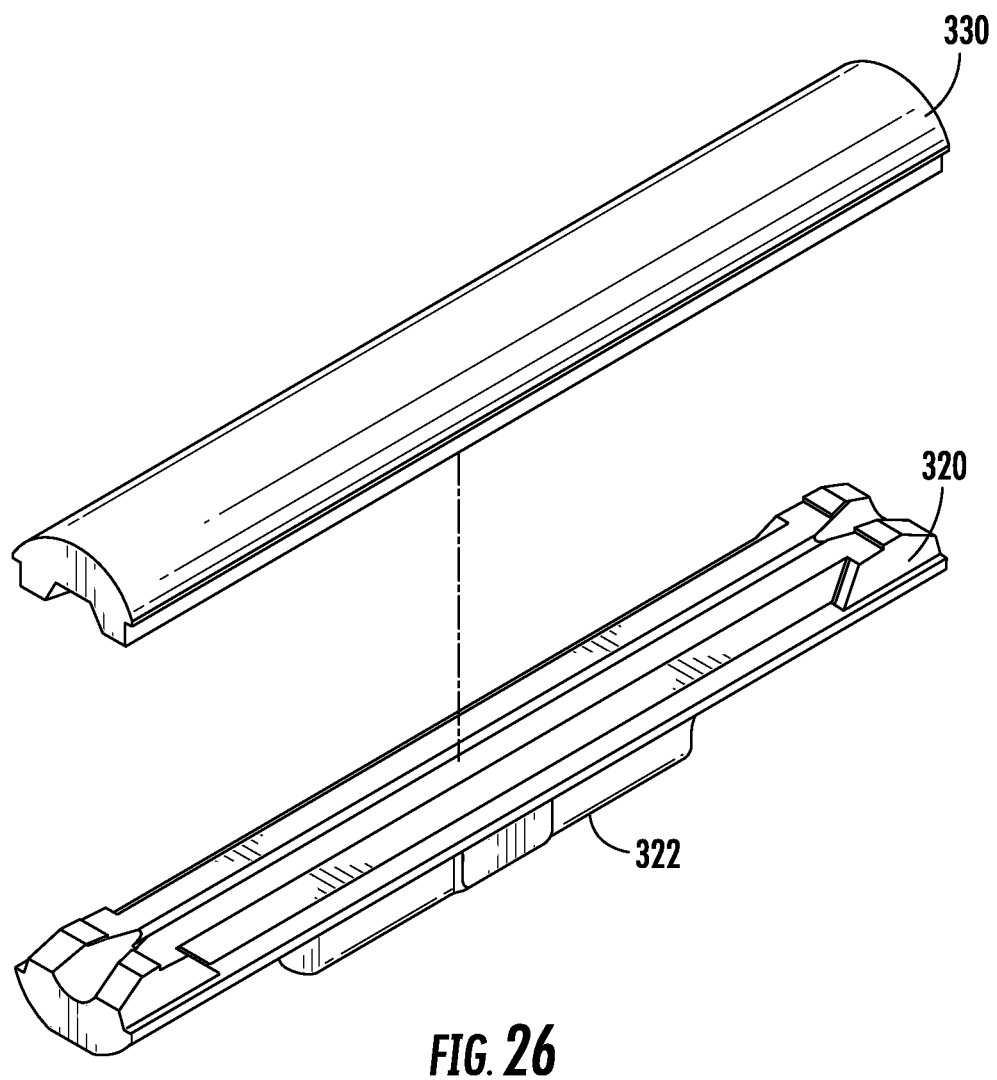
FIG. 26 is a detailed perspective view of the splice parts of FIG. 24.
Figure 27A:
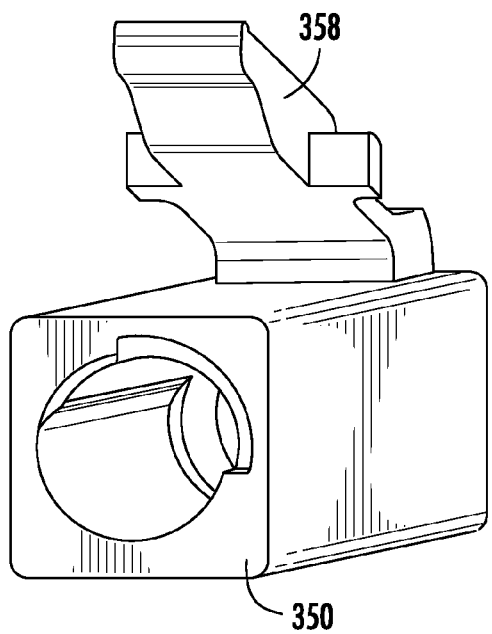
FIGS. 27A-27D depicts various detailed views of the housing of FIG. 24 that can active one or more splice components of the optical fiber connector.
Figure 27B:
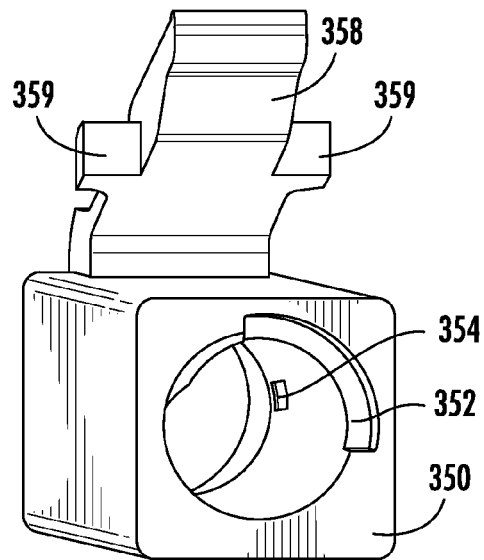
Figure 27C:
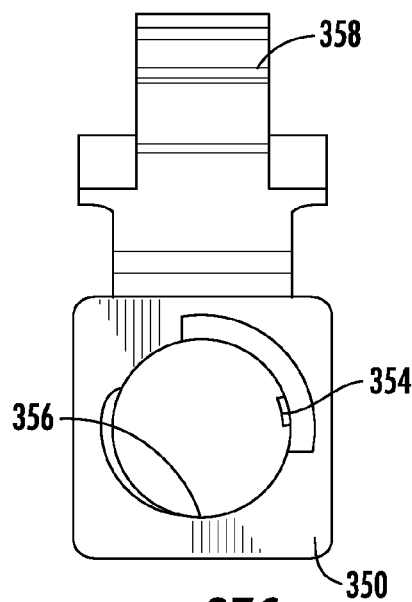
Figure 27D:
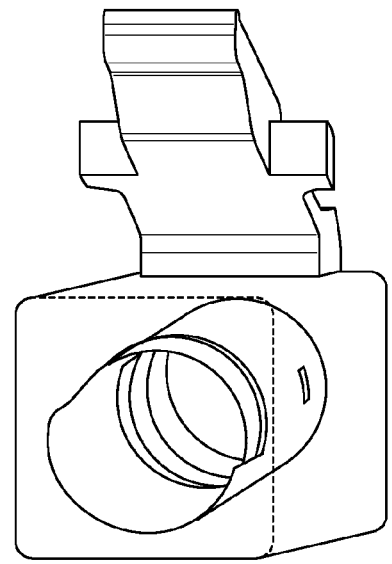

FIG. 26 is a detailed perspective view of the splice parts 320, 330. As shown, splice part 320 includes a keel 322. When fiber optic connector is assembled, keel 322 extends through the window 318 of splice housing 310 so that the activation mechanism such as on housing 350 can bias the splice parts 320, 330 together when rotated to the proper position. Splice parts 320 also includes a groove for receiving and aligning the stub optical fiber 206 with the optical fiber secured by handler 10. Furthermore, the splice parts may be suitable for securing a portion of bare optical fiber, coated optical fiber, a portion of a buffered optical fiber, or combinations thereof by sizing one or more of the splice parts accordingly. Other suitable mechanisms for biasing one or more of the splice parts together for securing the optical fiber and stub optical fiber are also possible. In other fiber optic connectors, the activation mechanism may have another structure such as a wedge that uses a linear activation in a generally parallel direction to the axis of the connector or a push button activation mechanism that use a linear activation in a transverse direction to the axis of the connector.

Figure 24:
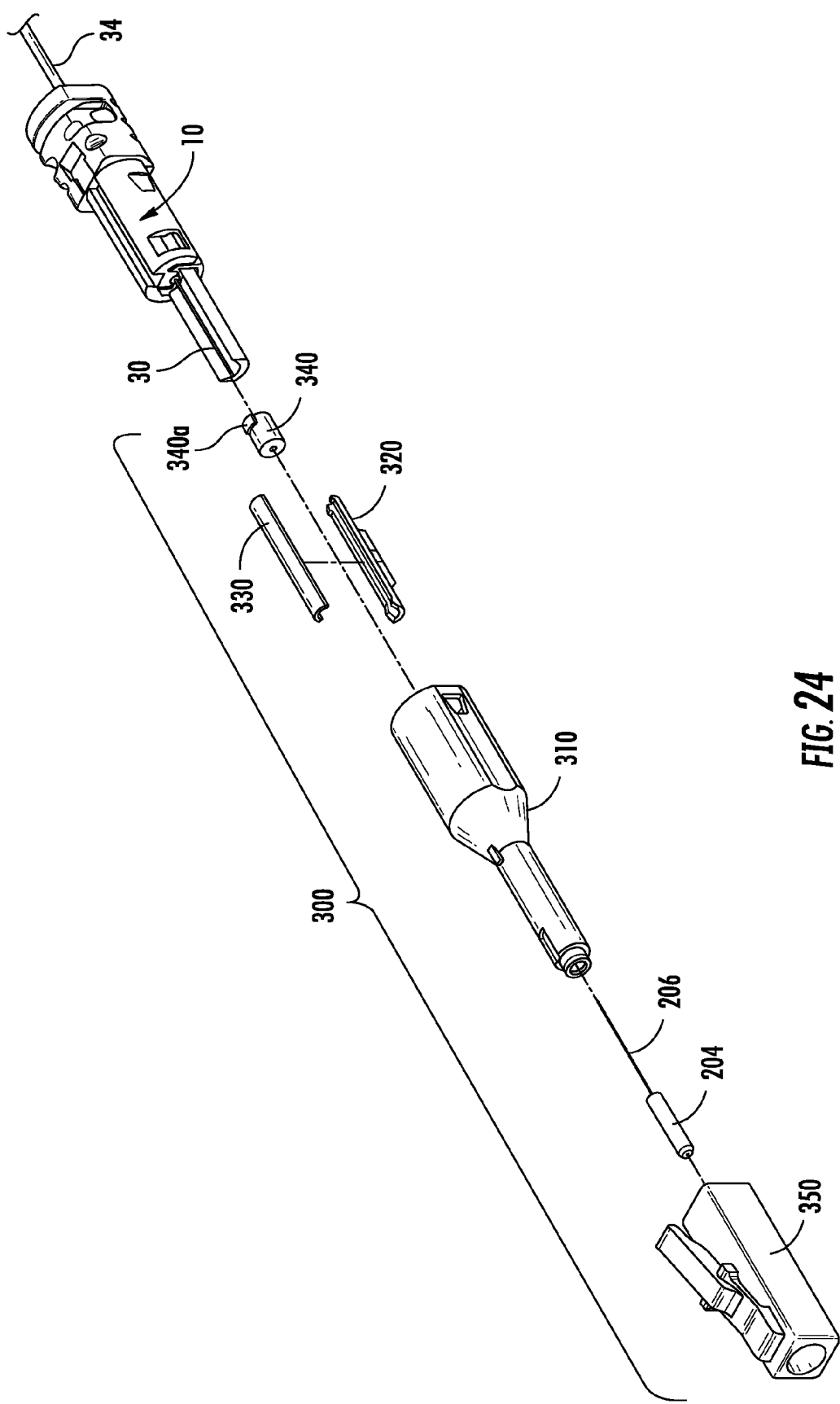
FIG. 24 is a partially exploded view of an optical fiber connector that interfaces with an optical fiber holder for making a mechanical splice.

FIGS. 27A-27D depicts various detailed views of the housing of FIG. 24 that cooperates with splice housing 310 by fitting onto a portion thereof. Specifically, splice housing 310 is positioned and inserted into housing 350 so that protrusion 354 is aligned with rotation feature 319 (i.e., the slot) of splice housing 310. Housing 350 is correctly oriented when housing keying portion 316 fits into groove 352 and is held in place with a friction fit with splice housing 310. Moreover, the groove 352 and housing keying portion 316 protect the splice housing 310 from over-rotation of housing 350 and inadvertently breaking off protrusion 354. Stated another way, protrusion 354 controls the linear and rotational placement of housing 350 relative to splice housing 310 and the assembly is protected from over-rotation. At this point, the protrusion 354 is at the turn in the rotation feature 319 and the splice parts are in the unbiased position (i.e., open position). In other words, the housing 350 can only move with respect to the splice housing 310 along the rotation feature (i.e., the slot). Thus, fiber optic connector 300 is assembled and ready for receiving optical fiber 30 secured by handler 10.

As the handler 10 is inserted and secured to the splice housing 310 the optical fiber 30 secured by the handler 10 is inserted past the lead-in 340 and positioned between the splice parts 320, 330 and abutted with stub optical fiber 206. Moreover, the optical fiber 30 has a bend therein for maintaining physical contact with the stub optical fiber 206 since it is slightly longer than the distance within the fiber optic connector. Then, the craft can secure the mechanical splice by rotating housing 350, thereby biasing the splice parts 320,330 together for clamping the optical fibers therein and completing the termination process.

Housing 350 includes a suitable activation feature 356 that uses a suitable movement such as rotational movement for biasing the splice parts 320, 330 together. More specifically, activation feature 356 is a cam surface (i.e., an eccentric surface disposed on the passageway of housing 350) for biasing the splice parts 320,330 together, thereby securing the abutment of the stub optical fiber 206 with the optical fiber 30. Simply stated, the activation feature 356, in this case, the cam surface of housing 350 pushes on the keel 322 of splice part 320 that extends through the window 318 of splice housing 310 as it is rotated, thereby biasing the splice parts 320,330 together and securing the abutment of the optical fibers. In this embodiment, housing 350 is configured with an LC connector footprint and includes a latch 358 molded along with latch ears 359 on either side thereof for securing the same in an LC adapter. Of course, the concepts disclosed may be used with other fiber optic connector footprints as shown in FIGS. 28 and 29.

As known in the art, one or more of the components or portions of the components of the fiber optic connector (i.e., the splice housing and/or splice component(s)) may be translucent so the craft and/or a tool can view the glow of the mechanical splice for evaluating the continuity of the mechanical splice as known. For instance, U.S. Pat. No. 6,816,661 discloses methods for evaluating the continuity of the mechanical splice. Moreover, the housing or other component may have one or more view ports for viewing the glow of the mechanical splice to evaluate the continuity of the mechanical splice.

Figure 28:
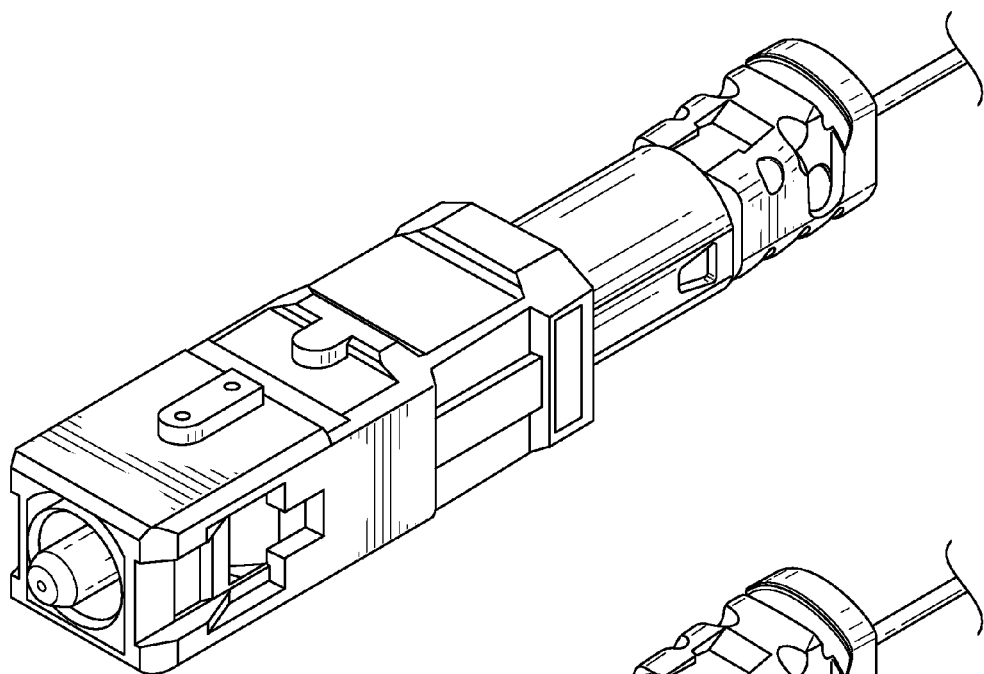
FIGS. 28-30 depict perspective views of different types of optical fiber connectors according to the concepts disclosed herein.
Figure 29:
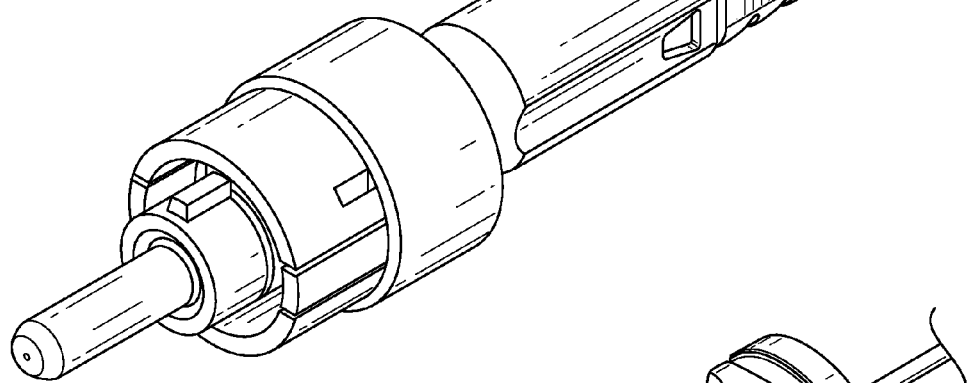
Figure 30:
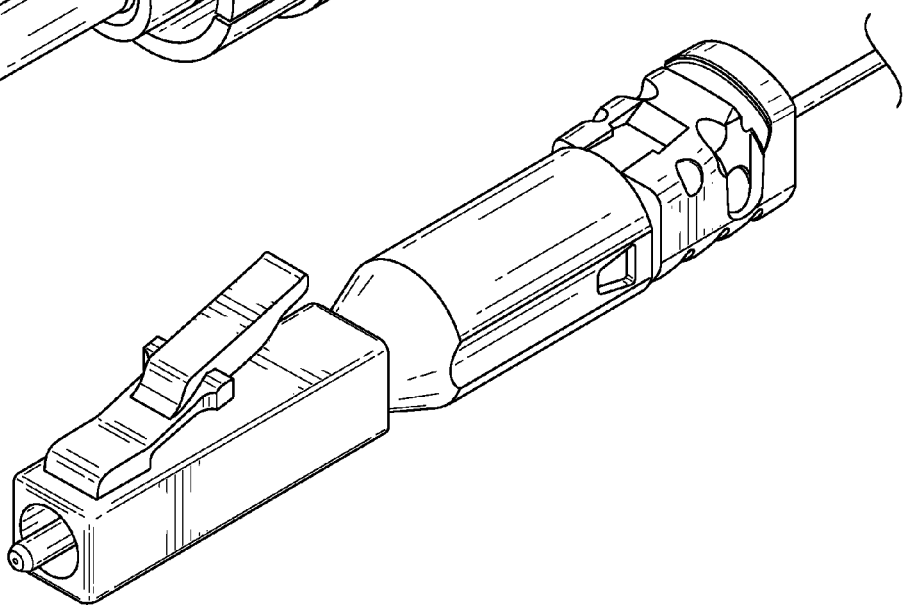
Figure 31A:
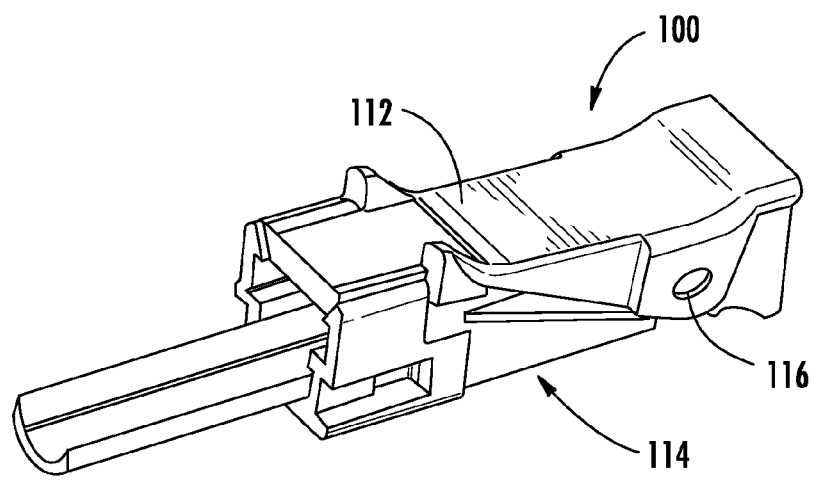
FIGS. 31A-31F depicts various view of another optical fiber handler in both the open and closed positions.
Figure 31B:
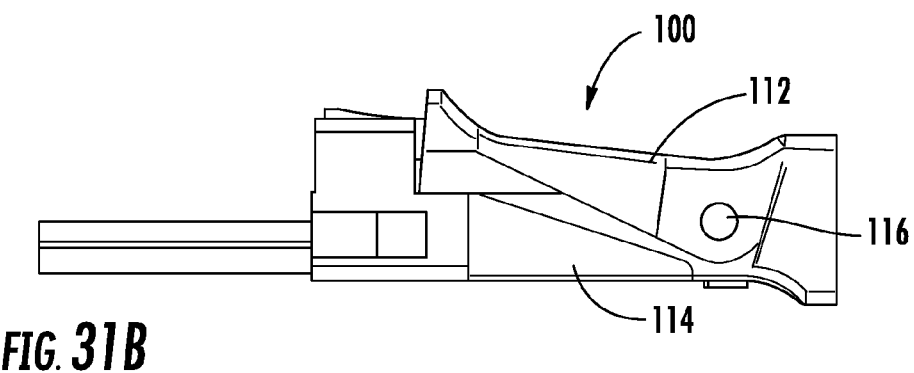
Figure 31C:
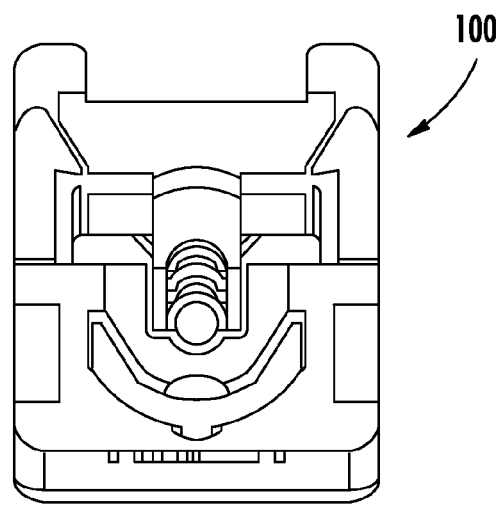
Figure 31D:
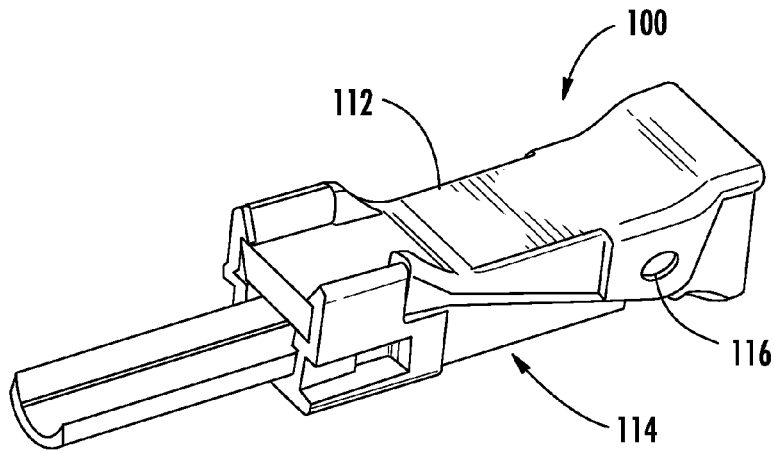
Figure 31E:
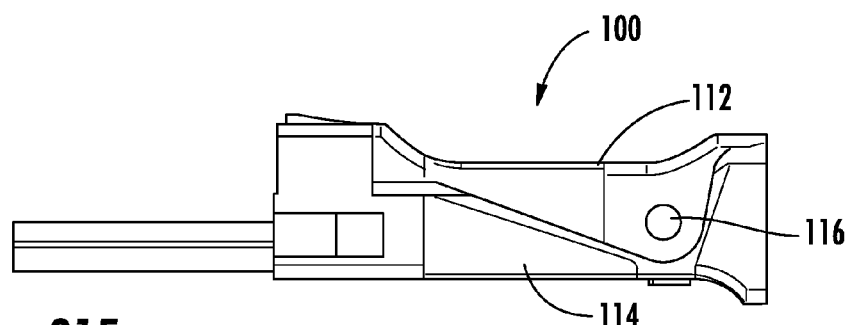
Figure 31F:
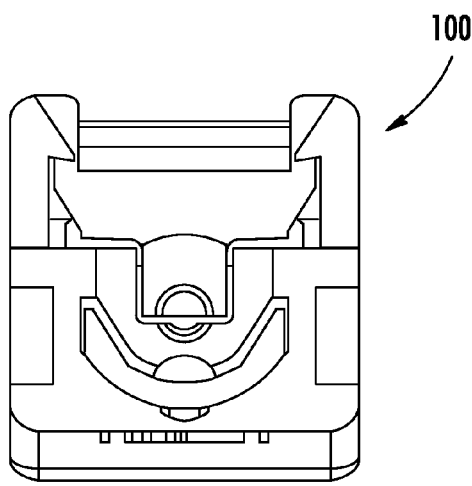

FIGS. 28-30 depict perspective views of different types of optical fiber connectors as finished cable assemblies according to the concepts disclosed herein. Specifically, FIGS. 28-30 respectively depict a SC fiber optic connector as part of a cable assembly, a ST fiber optic connector as part of a cable assembly, and a LC fiber optic connector as part of a cable assembly.

FIGS. 31A-31F depicts various view of handler 100 depicted above in both the open and closed positions. Handler 100 is similar to handler 10 and includes a first portion 112 and a second portion 114 that are attached together. The second portion 114 can pivot relative to the first portion 112 (or vice versa) and the handler 100 defines a passageway (not numbered) extending therethrough from a first end 111 to a second end 113 of the handler 10 for receiving one or more optical fibers therein. As with handler 10, handler 100 can secure the at least one optical fiber thereto by pivoting the first portion 112 relative to the second portion 114 for clamping onto the optical fiber, buffer layer, etc. Specifically, handler 100 has a pivot point 116 adjacent to one end and a latching portion 118 adjacent to the other end for securing the first portion 112 to the second portion 114. Like handler 10, pivot point 116 is adjacent to a rear end and latching portion 118 is adjacent to a front end of handler 10; however, this arrangement could be reversed in other embodiments. Hander 100 uses resilient fingers (not numbered) on second portion 114 for securing the first portion 112 with second portion 114 in the closed position. Further, a part of the first portion 112 fits within a part of the second portion 114 when the handler 100 is either the open or closed position, thereby creating a relatively compact design.

Still other handler designs are possible for securing an optical fiber and interfacing with other devices for preparation and termination, thereby making these tasks simple, easy, and repeatable for the craft. For instance, other handlers may use a push button for securing the optical fiber to the same.

Although preferred embodiments and specific examples were illustrated and described herein, it will be readily apparent to those of ordinary skill in the art that other embodiments and examples can perform similar functions and/or achieve like results. All such equivalent embodiments and examples are within the spirit and scope of the present disclosure and are intended to be covered by the appended claims. It will also be apparent to those skilled in the art that various modifications and variations can be made to the embodiments shown. Thus, it is intended that the disclosure and/or claims cover the modifications and variations.

We claim:

1. An optical fiber handler for attaching to at least one optical fiber, comprising:
   a first portion having at least one pivot boss and at least one latching boss; and
   a second portion having at least one pivot boss receiving feature, at least one latching boss receiving feature and a keying feature, wherein the second portion can pivot relative to the first portion and the optical fiber handler defining a passageway extending through the optical fiber handler from a first end to a second end of the optical fiber handler, wherein the optical fiber handler can secure at least one optical fiber thereto by pivoting the first portion relative to the second portion.

2. The optical fiber handler of claim 1, the at least one pivot boss being adjacent to a first end and the at least one latching boss being adjacent to a second end.

3. The optical fiber handler of claim 1, further including at least one boss for attaching the optical fiber handler to another structure.

4. The optical fiber handler of claim 1, wherein a part of the first portion fits within a part of the second portion.

5. The optical fiber handler of claim 1, the passageway defining a clamping portion for securing a bare optical fiber, coated optical fiber or an upcoated optical fiber.

6. The optical fiber handler of claim 1, further including a fiber guide that is movable along a longitudinal direction of the optical fiber handler.

7. The optical fiber handler of claim 1, further including a fiber guide that is biased outward using a resilient member.

8. The optical fiber handler of claim 1, wherein the optical fiber handler is attached to a mechanical splice connector to form a portion of the mechanical splice connector.

9. The optical fiber handler of claim 1, wherein the optical fiber handler can cooperate with at least one fiber preparation tool for preparing the at least one optical fiber for termination.

10. The optical fiber handler of claim 9, wherein the at least one fiber preparation tool is a cleaver, the cleaver having an interface for aligning and positioning the optical fiber handler therewith for preparing the optical fiber secured by the optical fiber handler to a predetermined length.

11. The optical fiber handler of claim 9, wherein the at least one fiber preparation tool is a stripper for removing one or more coatings from an optical fiber secured by the optical fiber handler, the stripper configured for interfacing with the optical fiber handler.

12. The optical fiber handler of claim 9, wherein the optical fiber handler is pre-loaded in the at least one fiber preparation tool.

13. The optical fiber handler of claim 1, wherein the optical fiber handler is secured to at least one optical fiber and the optical fiber handler may be released from the at least one optical fiber to re-position and/or re-secure the at least one optical fiber.

14. An optical fiber handler comprising first and second portions, wherein:
   the first and second portions of the optical fiber handler comprise at least one pivot boss, at least one latching boss, at least one pivot boss receiving feature, and at least one latching boss receiving feature;
   the second portion can pivot relative to the first portion;
   the optical fiber handler defines a passageway extending through the optical fiber handler from a first end to a second end of the optical fiber handler; and
   the optical fiber handler can secure at least one optical fiber thereto by pivoting the first portion relative to the second portion.

15. The optical fiber handler of claim 14 wherein the latching boss receiving feature comprises a latching window or recessed portion.

16. The optical fiber handler of claim 14 wherein the pivot boss receiving feature comprises a window, an aperture, or a recess.

17. The optical fiber handler of claim 14 wherein the latching boss comprises a resilient finger.

18. The optical fiber handler of claim 14 wherein:
   the first portion of the optical fiber handler comprises at least one pivot boss and at least one latching boss; and
   the second portion of the optical fiber handler comprises at least one pivot boss receiving feature and at least one latching boss receiving feature.

19. The optical fiber handler of claim 14 further comprising a keying feature.

20. The optical fiber handler of claim 14 further comprising a keying feature disposed on the first portion of the optical fiber handler or the second portion of the optical fiber handler.

21. The optical fiber handler of claim 1 further comprising a keying feature.

22. The optical fiber handler of claim 1 further comprising a keying feature disposed on the first portion of the optical fiber handler or the second portion of the optical fiber handler.

23. The optical fiber handler of claim 1 wherein the latching boss receiving feature comprises a latching window or recessed portion.

24. The optical fiber handler of claim 1 wherein the pivot boss receiving feature comprises a window, an aperture, or a recess.

25. The optical fiber handler of claim 1 wherein the latching boss comprises a resilient finger.

* * * * *